United States Patent
Stilwell et al.

(10) Patent No.: US 8,028,788 B2
(45) Date of Patent: Oct. 4, 2011

(54) SPRING APPLIED BRAKE AND DRIVE AXLE ASSEMBLY

(75) Inventors: Edmund Stilwell, Milwaukie, OR (US); Duane C. Richards, Tigard, OR (US)

(73) Assignee: NMHG Oregon, LLC, Portland, OR (US)

( * ) Notice: Subject to any disclaimer, the term of this patent is extended or adjusted under 35 U.S.C. 154(b) by 159 days.

(21) Appl. No.: 12/388,713

(22) Filed: Feb. 19, 2009

(65) Prior Publication Data

US 2010/0206655 A1  Aug. 19, 2010

(51) Int. Cl.
*B60K 17/00* (2006.01)
*B60T 13/22* (2006.01)

(52) U.S. Cl. .................. 180/370; 188/170; 303/71

(58) Field of Classification Search .......... 180/370; 188/166, 170, 171, 173; 303/71
See application file for complete search history.

(56) References Cited

U.S. PATENT DOCUMENTS

| | | | | |
|---|---|---|---|---|
| 3,831,718 A * | 8/1974 | Muller et al. | ................ | 188/170 |
| 3,911,760 A | 10/1975 | Elbers et al. | | |
| 4,037,694 A * | 7/1977 | Keese | ................ | 192/221.1 |
| 4,152,952 A | 5/1979 | Fulmer | | |
| 4,358,000 A * | 11/1982 | Cumming | ................ | 188/71.5 |
| 4,385,528 A | 5/1983 | Pauwels | | |
| 4,424,874 A * | 1/1984 | Koike et al. | ................ | 180/370 |
| 4,560,034 A * | 12/1985 | Windish et al. | ................ | 188/72.3 |
| 4,667,527 A * | 5/1987 | Ehrlinger et al. | ................ | 74/411.5 |
| 4,667,784 A * | 5/1987 | Cronin | ................ | 192/221 |
| 4,714,130 A * | 12/1987 | Ujita et al. | ................ | 180/262 |
| 4,856,622 A * | 8/1989 | Sartain et al. | ................ | 188/170 |
| 4,989,703 A | 2/1991 | Forsyth et al. | | |
| 5,050,710 A * | 9/1991 | Bargfrede | ................ | 188/71.6 |
| 5,050,939 A | 9/1991 | Middelhoven et al. | | |
| 5,112,113 A | 5/1992 | Wagner et al. | | |
| 5,238,298 A | 8/1993 | Wagner et al. | | |
| 5,536,219 A * | 7/1996 | Umemoto et al. | ................ | 475/225 |
| 5,639,074 A * | 6/1997 | Greenhill et al. | ................ | 267/162 |
| 6,357,558 B1 * | 3/2002 | Case et al. | ................ | 188/71.5 |
| 6,405,837 B1 * | 6/2002 | Muramoto | ................ | 188/72.5 |
| 6,675,940 B2 * | 1/2004 | Maurice | ................ | 188/171 |
| 6,743,002 B1 * | 6/2004 | Millar et al. | ................ | 418/61.3 |
| 6,817,963 B1 * | 11/2004 | Solka | ................ | 475/323 |
| 7,044,883 B2 * | 5/2006 | Andersson et al. | ................ | 475/331 |
| 7,108,108 B1 * | 9/2006 | Heinzeroth | ................ | 188/67 |
| 7,131,518 B2 * | 11/2006 | Weiss | ................ | 188/67 |
| 7,258,208 B1 * | 8/2007 | Dennis et al. | ................ | 188/170 |
| 7,743,893 B2 * | 6/2010 | Daigre | ................ | 188/170 |
| 2003/0057037 A1 * | 3/2003 | Maurice | ................ | 188/171 |
| 2003/0205427 A1 * | 11/2003 | Ima | ................ | 180/370 |
| 2004/0188194 A1 * | 9/2004 | Bittermann et al. | ................ | 188/170 |
| 2005/0006950 A1 * | 1/2005 | Versteyhe | ................ | 303/71 |
| 2005/0126657 A1 * | 6/2005 | Allman et al. | ................ | 141/286 |
| 2006/0054426 A1 * | 3/2006 | Fillmore et al. | ................ | 188/71.4 |
| 2006/0249338 A1 * | 11/2006 | Daigre | ................ | 188/71.5 |
| 2007/0175714 A1 * | 8/2007 | Saibold et al. | ................ | 188/170 |
| 2008/0314701 A1 | 12/2008 | Bogelein et al. | | |
| 2009/0192617 A1 * | 7/2009 | Arramon et al. | ................ | 623/17.16 |

* cited by examiner

*Primary Examiner* — Paul N. Dickson
*Assistant Examiner* — Barry Gooden, Jr.
(74) *Attorney, Agent, or Firm* — Stolowitz Ford Cowger LLP

(57) ABSTRACT

A brake assembly includes a piston housing, a piston moveably arranged within the piston housing, and a bearing cover mounted to the piston housing. A spring assembly is located between the piston and the bearing cover, wherein mounting the bearing cover to the piston housing compresses the spring assembly to achieve an initial spring force. The initial spring force of the spring assembly causes the piston to act against a vehicle brake when the brake assembly is mounted to a vehicle axle that passes through the spring assembly.

23 Claims, 16 Drawing Sheets

SPRING APPLIED BRAKE AND DRIVE AXLE ASSEMBLY

BACKGROUND

Off-highway industrial vehicles typically utilize dry or wet service brake and park brake assemblies. The service brakes are applied by applying hydraulic pressure to a slave cylinder. The dry brake slave cylinder applies pressure to friction brake shoes or discs which apply stopping torque to the wheel brake drums. In the case of a dry brake assembly, the slave cylinder is the wheel cylinder. For a wet brake axle, the slave cylinder is the brake piston. The piston applies pressure to an assembly of alternating friction discs and separator plates. The friction discs rotate with the wheel, axle shaft, or differential depending on the brake location. The separator plates are grounded to the drive axle housing.

The park brake assembly is most often actuated using park brake cables connected to various mechanical devices within the brake assembly or drive axle assembly. These park brakes are often actuated by a mechanical park brake lever assembly by the operator. The park brake cables often increase truck assembly complexity and cost.

In some cases, the park brake is actuated by a spring applied brake that functions in combination with or independently of the service brake. Typically, these spring applied park brakes are actuated separately from the service brake and require an additional park brake piston and the brake actuation system is increased in complexity. This park brake design requires two sets of working fluid brake lines; one for the service brake and one for the park brake. This increases vehicle assembly complexity and cost.

Another type of park brake system commonly used with off-highway industrial vehicles is a driveline brake. These brake assemblies usually comprise of friction discs and separator plates or a brake rotor and caliper assembly. These driveline park brake assemblies are typically located in series to the driveline.

The present invention addresses these and other problems.

SUMMARY OF THE INVENTION

A brake assembly is disclosed herein, as comprising a piston housing, a piston moveably arranged within the piston housing, and a bearing cover mounted to the piston housing. A spring assembly is located between the piston and the bearing cover, wherein mounting the bearing cover to the piston housing compresses the spring assembly to achieve an initial spring force, and wherein the initial spring force of the spring assembly causes the piston to act against a vehicle brake when the brake assembly is mounted to a vehicle axle that passes through the spring assembly.

A forklift truck is disclosed herein, as comprising vehicle brakes including a brake plate, and a brake piston configured to contact the brake plate to provide a braking force when the vehicle brakes are engaged. A spring assembly is compressed with a spring force, wherein the spring force causes the brake piston to act against the brake plate. A brake release mechanism is configured to cause the brake piston to move away from the brake plate to decrease the braking force. The forklift truck further comprises an axle shaft that passes through both the brake plate and the spring assembly.

A method is disclosed herein, comprising connecting a piston housing to a first drive axle housing, wherein a brake piston is located, at least in part, within the piston housing, and setting a gear backlash. The method further comprises preloading a differential bearing located, at least in part, in the bearing cover with a clamp force to set an engagement of differential gearing, wherein a spring assembly is located between the brake piston and the bearing cover. A brake assembly is installed in a second drive axle housing, and the piston housing is connected to the second drive axle housing, wherein an axle passes through the spring assembly. A spring force of the spring assembly causes the brake piston to act against a brake assembly. A brake assembly is engaged, wherein the brake assembly is located along a central portion of the axle.

The foregoing and other objects, features and advantages of the invention will become more readily apparent from the following detailed description of a preferred embodiment of the invention which proceeds with reference to the accompanying drawings.

DETAILED DESCRIPTION

Figure 1:
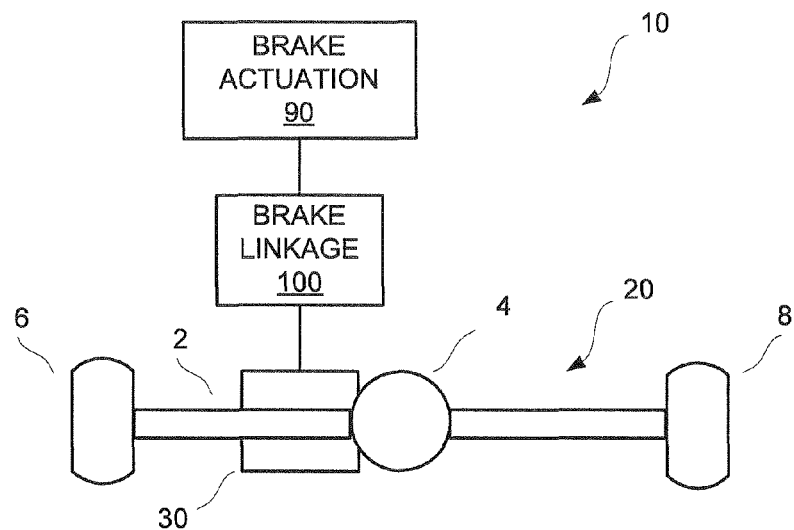
FIG. 1 illustrates a simplified block diagram of a vehicle braking system.

FIG. 1 illustrates a simplified block diagram of a vehicle braking system 10, including a brake assembly 30. The vehicle braking system 10 may be understood to be operable with, or assembled in, a forklift truck, industrial vehicle, off-road vehicle, or materials handling vehicle, for example.

The vehicle braking system 10 comprises brake actuation 90 which may include one or more brake pedals, buttons, toggles, switches, or toggles, for example. Brake actuation 90 may be commanded or requested by a vehicle operator, by a vehicle sensor, or by a vehicle processor. Brake actuation 90 may actuate one or both of a service brake and a parking brake operation.

Brake actuation 90 is illustrated as being connected to the brake assembly 30 by brake linkage 100. Brake linkage 100 may include physical linkage, cables, cams, rods or other mechanical devices. Brake linkage 100 may further, or alternatively, include hydraulic linkage, electrical linkage, or pneumatic linkage to the brake assembly 30.

Brake assembly 30 is illustrated as being mounted to, or integral with, a vehicle drive axle assembly 20. The brake assembly 30 may act directly onto a axle shaft 2 via brake plates, pistons, calipers or other engagement means to stop or impede a rotation of the axle shaft 2. The brake assembly 30 may be understood to cause the vehicle to decelerate or to otherwise inhibit movement of the vehicle. In one embodiment, the brake assembly 30 is configured to provide one or both of service brake and parking brake operations for a vehicle. The brake assembly 30 comprises a spring-applied brake.

The vehicle drive axle assembly 20 is further illustrated as comprising two or more wheels 6, 8 located at either end of the axle shaft 2. The wheels 6, 8 may be understood to include wheel hubs and tires that rotate when the vehicle is moving. A differential 4 is shown at an approximate midpoint of the vehicle drive axle assembly 20, and operates to transfer power from a drive train or other power source and cause a rotation of the axle shaft 2.

Figure 2:
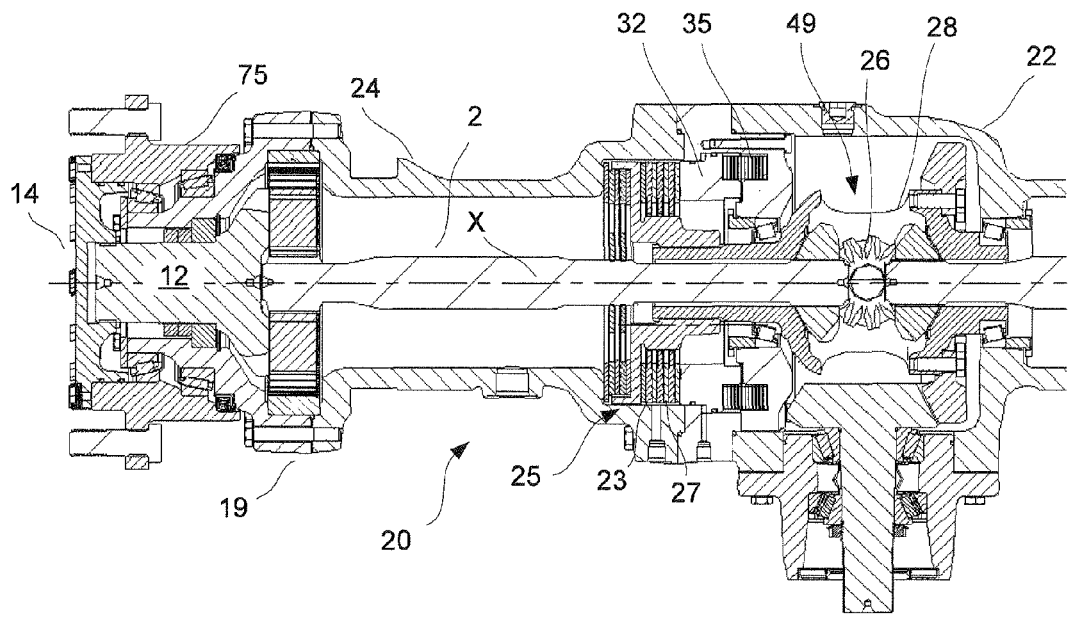
FIG. 2 illustrates a cross-sectional view of an example drive axle assembly.

FIG. 2 illustrates a cross-section view of an example drive axle assembly 20, such as that shown in the vehicle braking system 10 of FIG. 1. The cross-sectional view shows approximately one half of the drive axle assembly 20. The axle shaft 2 is located within a drive axle housing comprising a first drive axle housing 22 and a second drive axle housing 24. First and second drive axle housings 22, 24 may be designated, or referred to, as left and right drive axle housings, or as first and second trumpet arms in certain embodiments. Differential gearing 26 is housed in a differential housing 28. The differential gearing 26 is connected to the axle shaft 2. At either end of the axle shaft 2 is a planetary carrier 12. A wheel hub 75 is mounted to the wheel bearing support 19 via a wheel hub coupler 14.

The drive axle assembly 20 comprises vehicle brakes, such as brake disc assembly 25. The brake disc assembly 25 may comprise one or more braked discs. For example, brake disc assembly 25 may include one or more brake plates or separator plates 27 and one or more friction discs 23. The one or more separator plates 27 may be attached to the drive axle 20, so they do not rotate, but are free to slide in an axial direction. The brake disc assembly 25 may act directly onto one or both of the axle shaft 2 and the differential housing 28. In one embodiment, the brake disc assembly 25 is splined or connected to both the axle shaft 2 and the differential housing 28.

A brake piston 32 may be configured to contact a brake assembly 25 to provide a braking force when the vehicle brakes are engaged or actuated. In one embodiment, the brake piston 32 contacts one of the separator plates 27 when vehicle braking is requested. The separator plates 27 and friction discs 23 are shown located in the first drive axle housing 22.

A spring assembly 35 may be preloaded with a spring force, wherein the spring assembly 35 is configured to urge the piston 32 against the brake disc assembly 25. A brake release mechanism is configured to urge the piston 32 away from the brake disc assembly 25 to decrease the braking force. The brake release mechanism may comprise hydraulic fluid, pneumatic pressure or mechanical means that applies an opposite force against the piston 32, to counteract the spring force of the spring assembly 35. The combined opposite force and spring force acting on the piston 32 determines a level of braking force.

The hydraulic fluid may be inserted into a chamber located adjacent the piston 32. The piston 32 moves away from the separator plates 27 when brake release mechanism provides an opposite force which is greater than the preload force of the spring assembly 35. When the brakes are not engaged, the piston 32 may be moved several millimeters away from the separator plates 27 to allow for flow of hydraulic oil or other coolant to flow there between.

The piston 32 is spring applied for braking. A working fluid pressure may be increased for releasing a series of friction discs of the brake disc assembly 25. Braking and releasing the friction discs of the brake disc assembly 25 controls the rotation of the differential housing 28, which then controls the rotation of the wheel hub 75. A friction force between the separator plates 27 and the friction discs 23 may be varied by modulating a braking force applied to the brake disc assembly 25. By modulating the amount of braking force applied to the brake disc assembly 25, different levels of vehicle braking force may be applied, rather than providing a simple binary on and off response as with some conventional braking systems.

Modulation of the braking force may be accomplished by modulating a braking normal force. Modulation of the braking normal force may be accomplished by modulating the braking control pressure applied to the piston. The braking control pressure may be modulated directly by a proportional electro-hydraulic valve or by a manually operated hydraulic valve that is modulated by a pedal force combined with a pedal stroke ratio.

The axle shaft 2 and the differential housing 28 are shown passing through both the brake disc assembly 25 and the brake assembly 30. The axle shaft 2 may also pass through the spring assembly 35. In one embodiment, the spring assembly 35 comprises a series of concentric spring members. The concentric spring members may share a common centerline with the brake disc assembly 25. In one embodiment, the axis of rotation X of the axle shaft 2 is oriented along the common centerline.

To reduce drive axle and overall vehicle complexity and cost, a single spring applied brake assembly may provide combined operations of a vehicle service brake and a vehicle park brake. The single service and park brake assembly may use a common spring, piston, brake disc assembly and separator plates. This allows for a single working fluid brake line to the vehicle drive axle assembly 20, which reduces vehicle assembly time, complexity, and cost. This reduces the drive axle's internal brake actuation complexity and the number of redundant parts, and allows for the brake assembly (e.g. brake assembly 30 of FIG. 1) to be located at an approximate center section of the vehicle drive axle assembly 20.

Figure 3:
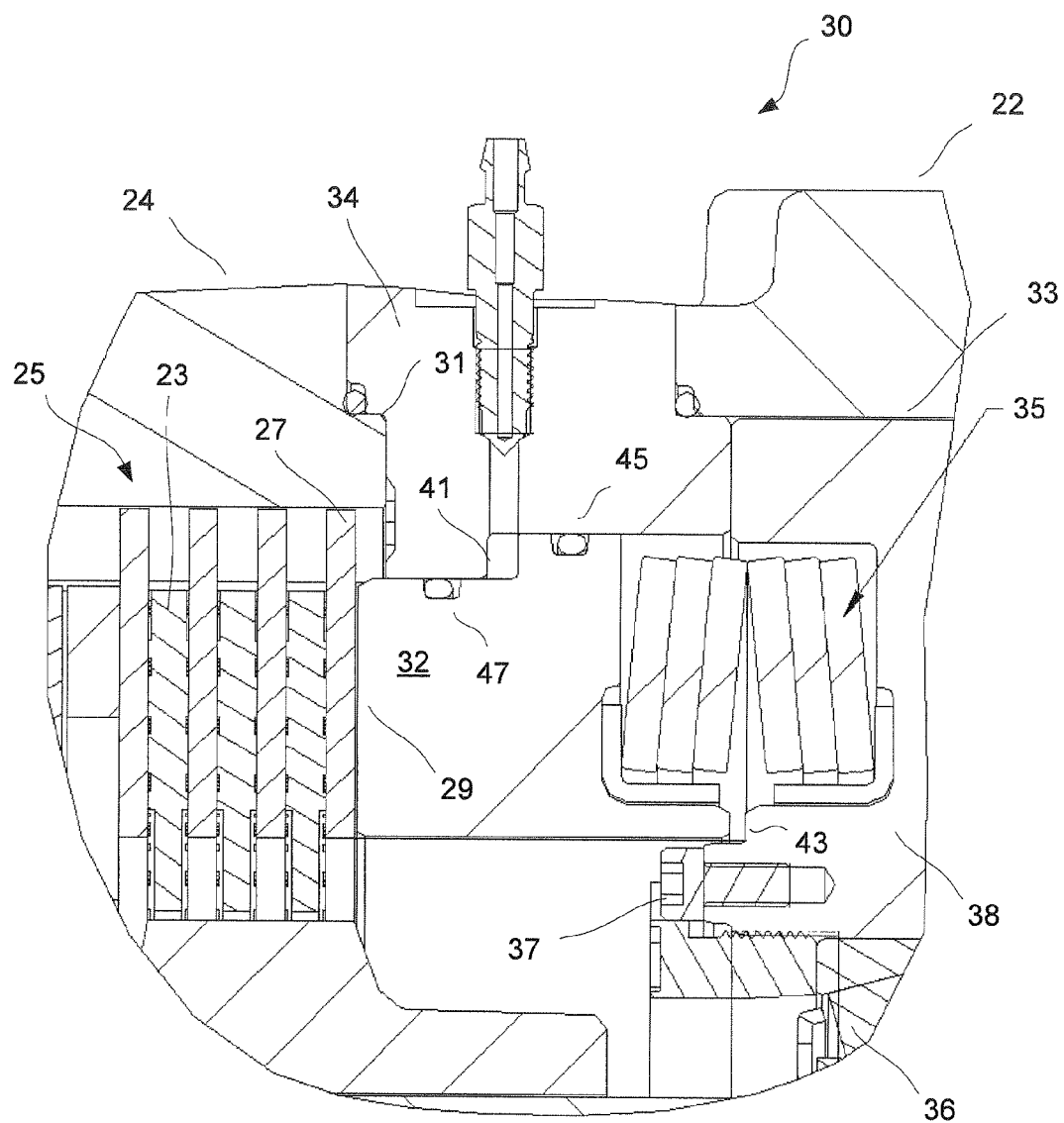
FIG. 3 illustrates a cross-sectional partial view of an example brake assembly.

FIG. 3 illustrates a cross-sectional partial view of an example brake assembly 30. The brake assembly 30 comprises a spring-applied braking system including a piston housing 34 and a piston 32 moveably arranged within the piston housing 34. A cover 38 is mounted to the piston housing 34. The cover 38 houses a differential bearing 36. The cover 38 may be referred to as a differential bearing cover. Brake chamber 41 is shown located between outer o-ring 45 and inner o-ring 47.

A spring assembly 35 is located between the piston 32 and the cover 38. When the cover 38 is mounted to the piston housing 34, this causes the spring assembly 35 to preload with a spring force. The spring force of the spring assembly 35 is configured to urge the piston 32 against a surface of the brake disc assembly 25 when the brake disc assembly 25 is mounted to the vehicle drive axle (FIG. 2). The spring assembly 35 comprises a plurality of concentric springs which may be stacked together or located adjacent one another, and share a common central axis.

The differential bearing cover 38 further houses a differential adjustment device 37 that adjusts a preload of the differential bearing 36. The differential adjustment device 37 may comprise one or more adjustment nuts and a cap screw. The differential adjustment device 37 preloads the differential bearing 36 and sets the gear backlash between the pinion gear and the ring gear. A proper adjustment of the backlash prolongs gear life.

Assembly of the differential bearing cover 38 to the piston housing 34 may further provide an alignment of the first drive axle housing 22 of the drive axle assembly 20, with the second drive axle housing 24 of the drive axle assembly 20. The first drive axle housing 22 may be aligned according to a second pilot surface 33. The second drive axle housing 24 may be aligned according to a first pilot surface 31 of piston housing 34.

The brake assembly 30 may operate as both a service brake and a park brake. The brake assembly 30 may be located at an approximate center section of the vehicle drive axle assembly 20 (FIG. 2). The brake assembly 30 may be coupled to the differential housing 28 (FIG. 2). The piston subassembly including piston 32 may be configured for locking and releasing the friction discs of the brake disc assembly 25. The piston subassembly is located inboard of the brake disc assembly 25.

The brake assembly 30 provides for an alignment of, or means to pilot, the first and second drive axle housings 22, 24. The brake assembly 30 further provides a preload of the brake actuation spring of the spring assembly 35, as a result of assembling together the piston 32, piston housing 34, and the differential bearing cover 38. The brake assembly 30 also supports and houses the differential bearing 36 and adjustment device 37. The differential assembly 49 (FIG. 2) and axle shaft 2 (FIG. 2) may rotate within the spring assembly 35.

The piston 32 and piston housing 34 operate to limit a stroke of the piston 32 according to one or more contact surfaces or mechanical stops 41, 43 within the brake assembly 30. The piston 32 contacts a braking surface 29 of the braking assembly 25 to engage the friction discs 23. In one embodiment, the brake assembly 30 comprises a plurality of concentric springs, where only one of the concentric springs is configured to contact the piston 32. The vehicle axle shaft 2 (FIG. 2) may be configured to pass through the center of the concentric springs. In one embodiment, only a single piston 32 is used in the entire brake assembly 30. In one embodiment, a single spring-applied and hydraulically released brake assembly 30 is located at the center section of the drive axle 2.

Figure 4A:
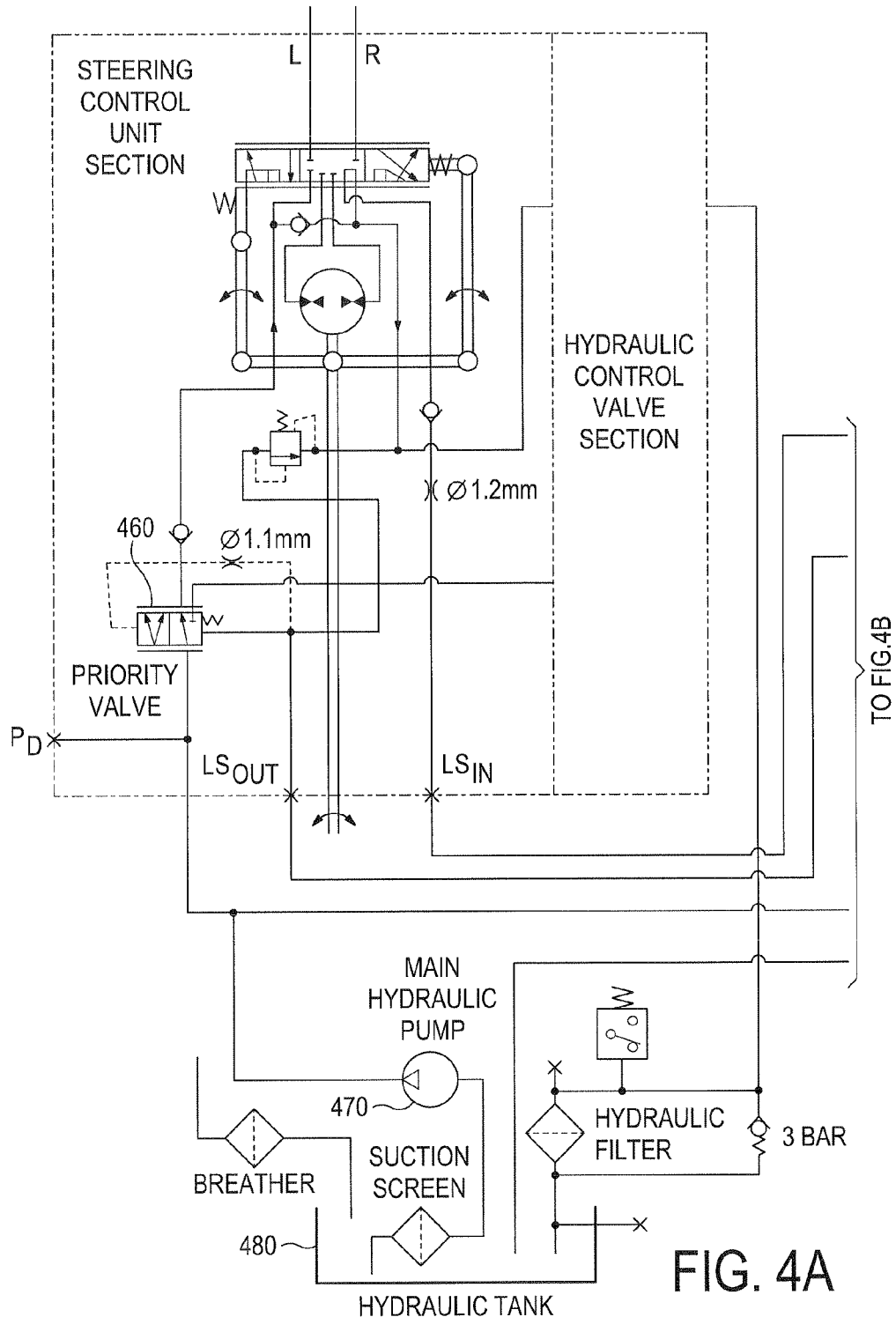
FIG. 4 illustrates a hydraulic schematic of a spring-applied braking system.
Figure 4B:
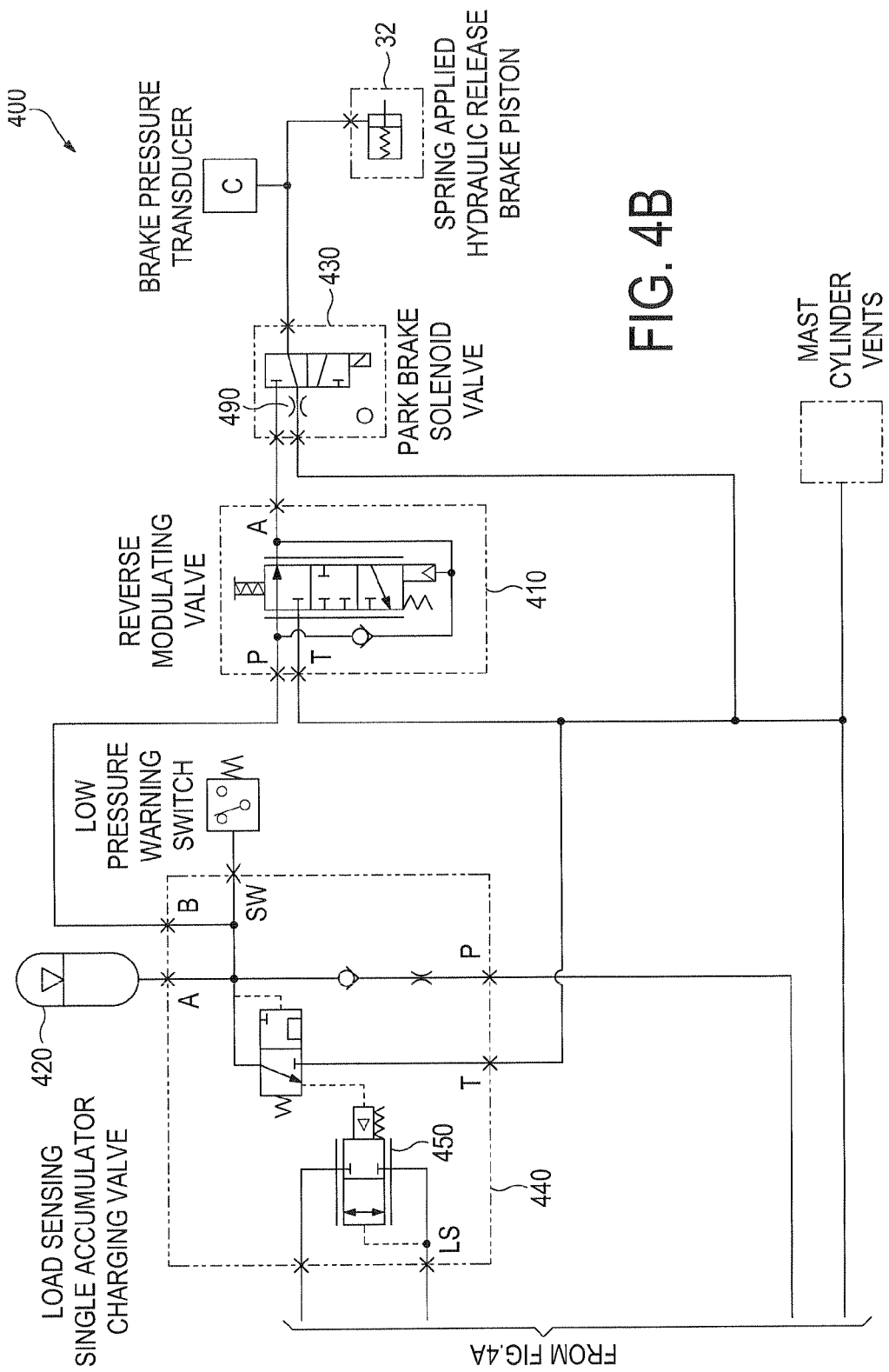

FIG. 4 illustrates a hydraulic schematic of a spring-applied braking system 400. The brake assembly 30 of FIG. 3 may be incorporated into a hydraulic system to control hydraulic pressure (e.g. brake fluid pressure) applied to the piston 32. The service brake may be manually controlled by a vehicle operator depressing a brake pedal assembly. Brake actuation 90 (FIG. 1) actuates a reverse modulating valve 410 to control the hydraulic pressure applied to the service brakes. Reverse modulating valve 410 maintains a pressure in the brake chamber 41 (FIG. 3) to a commanded value, or in proportion to the valve stroke. The brake chamber pressure may be reduced to zero as the reverse modulating valve 410 is stroked. The braking torque is inversely proportional to the brake fluid pressure applied.

An accumulator 420 stores a volume of hydraulic fluid at pressure as stored energy. The accumulator 420 may be installed in the hydraulic system to provide sufficient brake line pressure to permit several service braking events while the engine is off.

Park brake solenoid valve 430 routes regulated pressure to brake chamber 41 (FIG. 3) or dumps chamber pressure to tank 480 at atmospheric pressure when parked. In one embodiment, the park brake may be manually controlled by the vehicle operator pressing a park brake switch to electrically operate the park brake solenoid valve 430. The park brake control may be located in an on or off position. The park brake does not require brake line pressure or brake torque modulation to be engaged. Incorporating the park brake solenoid valve 430 into the park brake system allows for implementation of an automatic park brake that can be controlled by a transmission output speed sensor, for example. A valve or orifice 490 may be applied to control the rate of release of hydraulic fluid from the brake chamber 41 (FIG. 3) when the brakes are being applied.

The accumulator 420 interfaces with an accumulator charging valve 440. The accumulator charging valve 440 may be load sensing. The accumulator charging valve 440 may operate under control logic that causes the accumulator 420 to begin charging when the hydraulic pressure reaches a lower limit (such as 1300 psi), and to stop charging when the hydraulic pressure reaches an upper pressure limit (such as 1550 psi), for example.

When actuated by the accumulator control valve 440, valve 450 restricts load sensing flow, which causes the load sensing pressure to rise. When the load sensing pressure increases, a priority valve 460 is shifted to throttle pump flow and raise the main pressure to charge the accumulator 420. Priority valve 460 may be configured to interface or be communicatively coupled with main hydraulic pump 470.

The hydraulic actuation provided by the spring-applied braking system 400 addresses: a hold-off pressure (with zero braking torque); zero pressure (full spring-applied maximum braking torque); a brake pressure anchor point for controls to manage the transmission logic; and the onset of braking.

Figure 5:
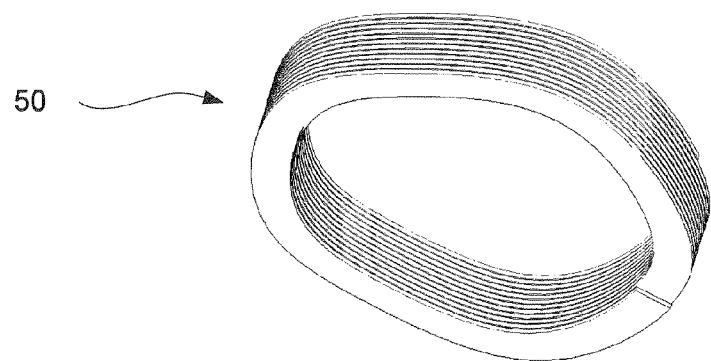
FIG. 5 illustrates an example embodiment of a spring assembly including wave springs.

FIG. 5 illustrates an example embodiment of a spring assembly 50 including one or more wave springs. The wave springs may be nested together, forming a concentric arrangement of separate wave spring components. Wave springs may provide a same or similar spring rate with less stroke or distance traveled, as compared to conventional coil springs. This provides for a more compact brake system. Wave springs provide spring force as a result of bending of the circular members, as opposed to torsion of coil springs. This results in a longer fatigue life. In one embodiment, the spring circular members are manufactured using a trapezoidal cross-section to improve performance and durability.

Figure 6A:
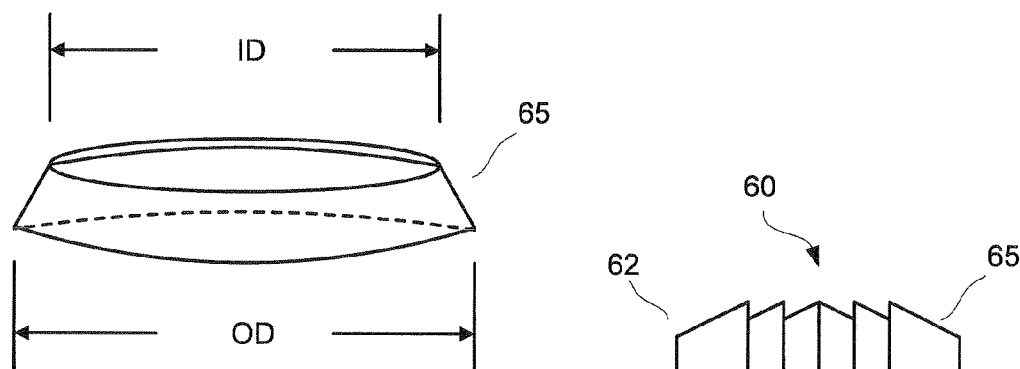
FIG. 6A illustrates an example of an individual spring component of the spring assembly illustrated in FIG. 6.
Figure 6:
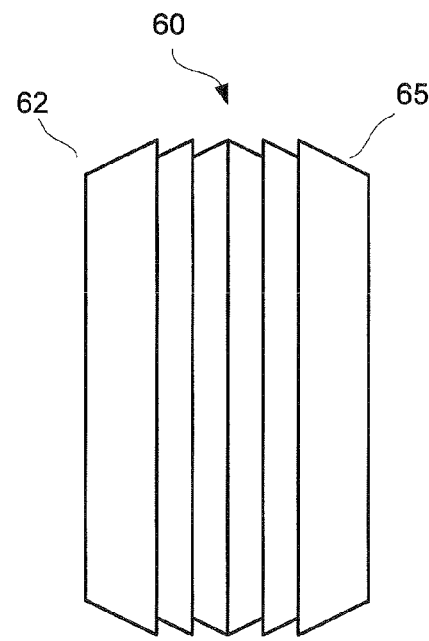
FIG. 6 illustrates a further example embodiment of a spring assembly.

FIG. 6 illustrates a further example embodiment of a spring assembly 60. A series of concentric springs comprise a plurality of conical disc shaped springs or washers 62, 65 located adjacent to one another. A first set of conical washers comprising washer 62 may be oriented in a first direction opposite to a second direction associated with a second set of conical washers comprising washer 65. In one embodiment, the spring assembly 60 comprises Belleville springs.

Belleville springs have a non-linear spring rate. By stacking the springs, the spring assembly 60 provides a more variable rate of spring force without completely compressing the springs. For example, a stack of two Belleville springs produces the same spring rate as a single Belleville spring, but does so with half the spring stroke.

FIG. 6A illustrates an example of an individual spring component such as washer 65 of the spring assembly illustrated in FIG. 6. The individual spring component 65 is illustrated as comprising an inner diameter ID and an outer diameter OD. An inner diameter ID of a first washer may be stacked inside of an outer diameter OD of a second washer when the spring assembly 60 of FIG. 6 is assembled.

Both the nested wave spring assembly 50 and the Belleville spring assembly 60 may be configured with relatively little axial length, compared to conventional coil springs. By using a single spring assembly, an even distribution of spring force is applied between the piston 32 (FIG. 3) and the brakes. This in turn applies an equal braking force to each of the wheel hubs. This is contrasted to those conventional systems where each hub is separately braked by a plurality of spring-applied brakes, and where each hub may receive a different amount of braking force. In certain applications, particularly those involving higher vehicle speeds, an even application of braking force to the wheels provides for a smoother and more even braking of the vehicle.

Figure 7:
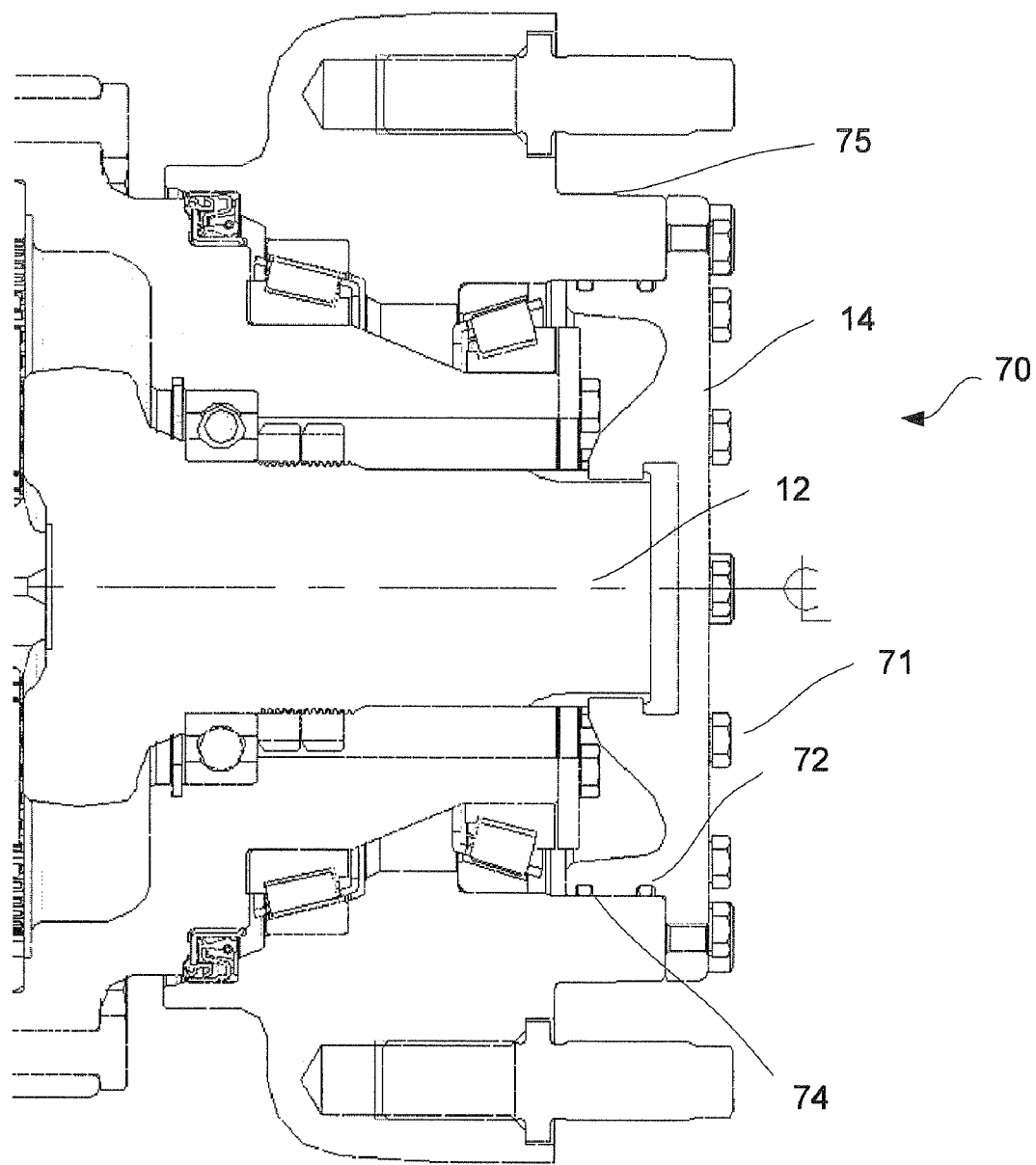
FIG. 7 illustrates an example wheel hub coupler assembly with an engaged wheel hub.

FIG. 7 illustrates an example wheel hub coupler assembly 70 with an engaged wheel hub 75. A wheel hub coupler 14 engages a planetary carrier 12 located at an approximate end of the axle shaft 2 (FIG. 2). The wheel hub coupler 14 is shown bolted to the wheel hub 75. The wheel hub coupler 14 provides a means with which to disengage the wheel hub 75 from the planetary carrier 12. Once the wheel hub coupler 14 is disengaged from the planetary carrier 12, the drive axle wheel hub 75 is free to rotate, even while the brake is fully locked.

During normal operation of the vehicle, the wheel hub coupler 14 transmits torque from the drive axle's planetary carrier 12 to the wheel hub 75. During an auxiliary operation of the vehicle, (e.g. when the vehicle is being towed), the wheel hub coupler 14 disengages the wheel hub 75 from the planetary carrier 12 to allow the wheel hub 75 to rotate freely. The wheel hub coupler 14 may comprise a disc-shaped part that has an outer bolt circle that connects the wheel hub coupler 14 to the wheel hub 75. The wheel hub coupler 14 is shown connected with a plurality of mounting bolts 71.

Figure 7A:
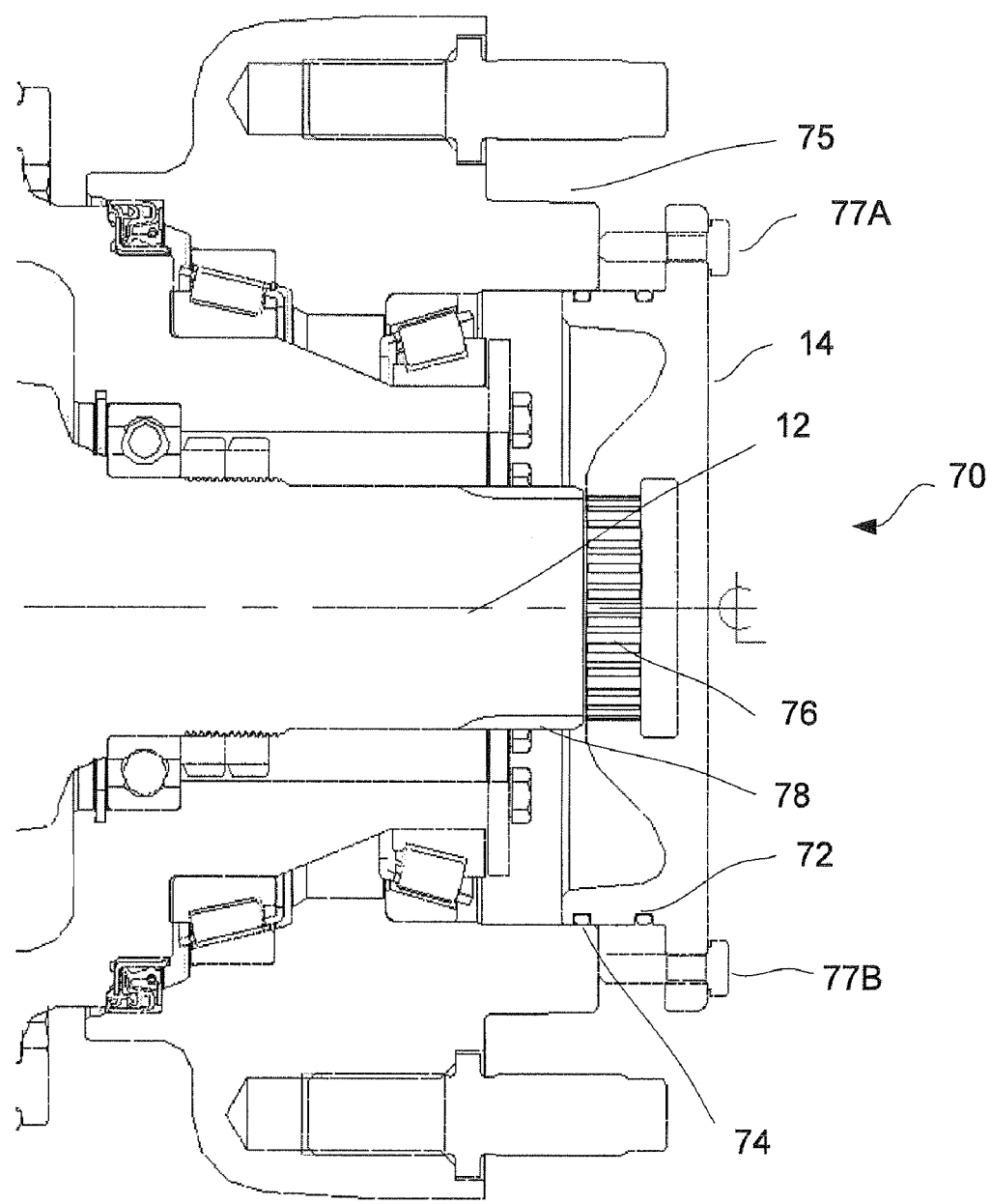
FIG. 7A illustrates the example wheel hub coupler assembly of FIG. 7 with the wheel hub disengaged.

One or more o-ring seals 72, 74 may be provided on the hub coupler pilot to prevent the axle shaft 2 from leaking oil. The outboard o-ring 72 prevents the wheel hub coupler pilot from corroding the entire length of the pilot, which may otherwise interfere with removal of the wheel hub coupler 14. The outboard o-ring 72 also assures that the inboard o-ring 74 does not get damaged during the disengagement procedure FIG. 7A illustrates the example wheel hub coupler assembly 70 of FIG. 7 with the wheel hub 75 disengaged from the planetary carrier 12. During normal operation of the vehicle, the wheel hub coupler's spline 76 engages with the planetary carrier spline 78 to transmit torque between the planetary carrier 12 to the wheel hub 75. During the auxiliary operation (e.g. when the vehicle is being towed), the wheel hub coupler's spline 76 disengages with the planetary carrier spline 78 so that the wheel hub 75 is free to rotate even with the vehicle brakes engaged or locked.

In one embodiment, the wheel hub coupler 14 comprises internal splines 76 that are configured to engage the planetary carrier 12 when the wheel hub 75 is locked to the axle shaft 2. The internal splines 76 may be configured to disengage the external splines 78 of the planetary carrier 12. When the splines 76, 78 are disengaged from each other, the wheel hub 75 is free to rotate about the axle shaft 2. The wheel hub coupler assembly 70 may further comprise one or more positioning devices 77A, 77B (illustrated as cap screws) that are configured to move the wheel hub coupler 14 along an axis of rotation (centerline) of the axle shaft 2 and away from the planetary carrier 12.

Disengaging the Wheel Hub Coupler

Remove hub mounting bolts 71 (FIG. 7).

Install cap screws 77A, 77B into threaded holes of the wheel hub coupler 14.

Advance the capscrews 77A, 77B in equal increments to jack or pull the wheel hub coupler splines 76 out of engagement of the planetary carrier splines 78.

Advance capscrews 77A, 77B until they are fully turned/threaded into the wheel hub coupler 14 to disengage the wheel hub coupler 14 from the planetary carrier 12. The capscrews 77A, 77B may be configured to limit the distance the wheel hub coupler 14 can be advanced outward, and away from the planetary carrier 12.

One or more o-ring seals 72, 74 may be provided on the hub coupler pilot to prevent the axle shaft 2 from leaking oil. The outboard o-ring 72 prevents the wheel hub coupler pilot from corroding the entire length of the pilot, which may otherwise interfere with removal of the wheel hub coupler 14. The outboard o-ring 72 also assures that corrosion or contamination does not damage the inboard o-ring 74 during the disengagement procedure.

Disengagement of the wheel hub coupler 14 may be provided for a vehicle that has been fitted with a spring applied brake. Where the spring applied brake has been actuated, and the mechanical, hydraulic, pneumatic or electric means for disengaging the brakes are temporarily unavailable, the wheel hub coupler 14 may be disengaged so that the vehicle may be towed or otherwise more easily transported to a maintenance area. In some embodiments, a vehicle that experiences an actuation system failure may automatically cause the brake assembly to become engaged.

The wheel hub coupler 14 can disengage with the planetary carrier 12 and still maintain an oil seal. This allows the vehicle to be towed to an appropriate service location without exposing the environment to lost oil, and without damaging internal components of the wheel hub coupler assembly 70.

Figure 8:
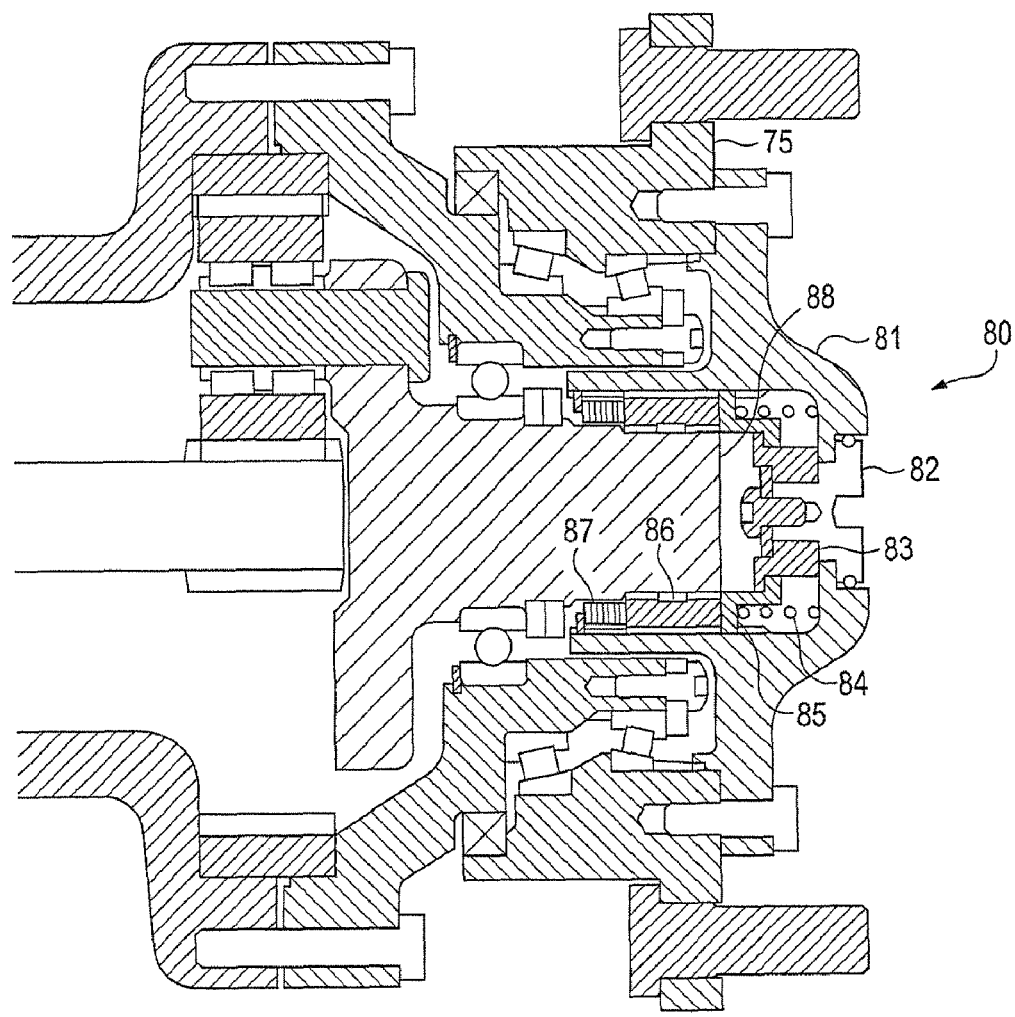
FIG. 8 illustrates an example wheel hub disconnect system.

FIG. 8 illustrates an example wheel hub disconnect system 80. In some embodiments, the wheel hub disconnect system 80 is provided for a vehicle having spring applied brakes (see, for example, the brake assembly 30 of FIG. 3). In the event that hydraulic or pneumatic pressure cannot be produced at the brake piston to overcome the spring force of the spring-applied brakes, the wheel hub disconnect system 80 allows for a simple means to disconnect the wheel hub assembly 75 from the drive axle gear train. The wheel hub disconnect system 80 allows the wheel hub 75 to free wheel when a spring applied brake is engaged.

The example wheel hub disconnect system 80 is illustrated as comprising a body portion 81, hub dial 82, screw engagement 83, engagement spring 84, actuation nut 85, clutch ring 86, return spring 87, and planetary carrier 88. The wheel hub disconnect system 80 locks and unlocks the wheel hub 75 to the planetary carrier 88.

Figure 8A:
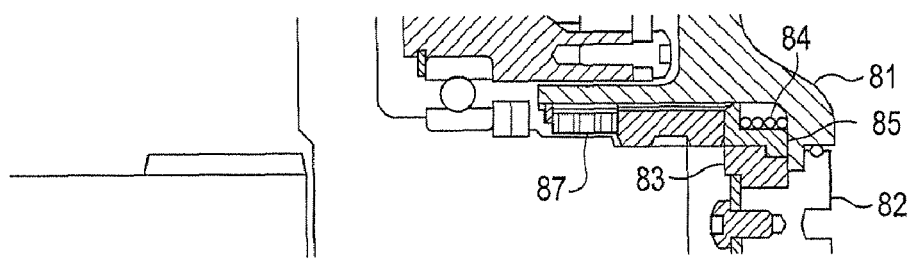
FIG. 8A illustrates the example system of FIG. 8 with the wheel hub disconnected.

FIG. 8A illustrates the wheel hub disconnect system 80 of FIG. 8 with the wheel hub 75 disconnected. The wheel hub 75 can be engaged and disengaged without any special tools. Furthermore, the wheel hub 75 can be disengaged without disassembling the drive axle. There is no oil leak when the wheel hub 75 is disengaged.

Wheel Hub Unlock:

Insert a drive ratchet into the hub dial 82.

Rotate the hub dial 82 counterclockwise.

The return spring 87 provides axial force to assist the clutch ring 86 out of engagement with the planetary carrier 88.

Wheel Hub Lock:

Insert drive ratchet into the hub dial 82.

Rotate the hub dial 82 clockwise.

The engagement spring 84 provides an axial force to assist the actuation nut 85 to push on the clutch ring 86.

The clutch ring 86 engages with the planetary carrier 88 after the splines are aligned. Alignment occurs when the vehicle is moved or when the planetary carrier 88 is rotated.

Figure 9:
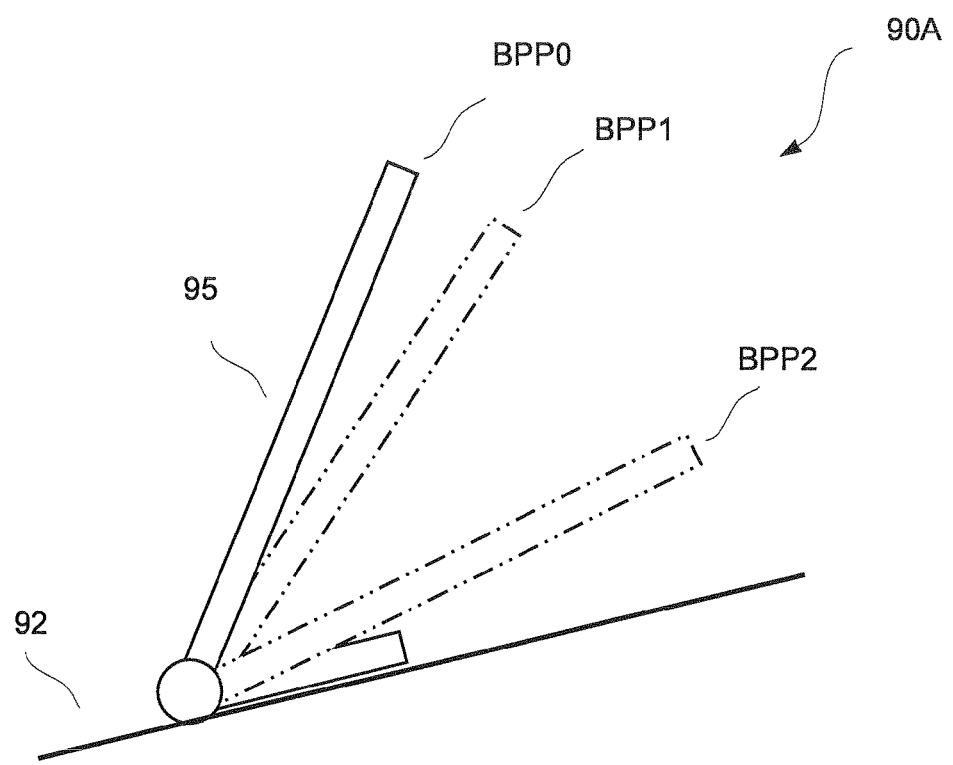
FIG. 9 illustrates an example brake pedal assembly.

FIG. 9 illustrates an example brake pedal assembly 90A. In one embodiment, brake pedal assembly 90A may be understood to provide brake actuation 90 as shown in FIG. 1. The brake pedal assembly 90A comprises one or more pedals 95 pivotally mounted to a vehicle operating platform 92. The pedal 95 is illustrated as being located in a plurality of operating positions. An initial position BPP0 may be understood to be a fully released position of the pedal 95. The pedal 95 is further shown at a partially depressed position BPP1 and a full depressed position BPP2. The rotational distance between the initial position BPP0 and the partially depressed position BPP1 may be understood to represent a first range of motion. The rotational distance between the partially depressed position BPP1 and the fully depressed position BPP2 may be understood to represent a second range of motion.

In one embodiment, the pedal 95 is a service brake pedal, wherein a braking force associate with the fully depressed position BPP2 is greater than a braking force associated with the partially depressed position BPP1. The initial position BPP0 may be understood to request zero service braking force. In one embodiment, a park brake force may be associated with the initial position BPP0 of the pedal 95, in certain vehicle modes of operation. For example, the vehicle brakes may be automatically engaged when the forklift truck is powered off.

In another embodiment, the pedal 95 is an inch/brake pedal. Two or more pedals 95 may be provided in the same vehicle to provide both an inch/brake pedal and a separate brake pedal. Where the pedal 95 identifies an inch/brake pedal, the first range of motion associated with pedal positions between the initial position BPP0 and the partially depressed position BPP1 may be understood to represent an inching operation. The second range of motion associated with pedal positions between the partially depressed position BPP1 and the fully depressed position BPP2 may be understood to represent a braking operation.

Inching is the process by which an operator controls the slow forward or reverse travel movement of a motorized vehicle by the light application of clutch torque through the transmission. Certain industrial vehicles including materials handling vehicles or fork lift trucks, include a dual-purpose inch/brake pedal. The inch/brake pedal operates to engage a vehicle braking system, and also to engage a vehicle transmission. The braking system may be fully engaged when the inch/brake pedal is fully depressed, whereas the vehicle transmission may be fully engaged when the inch/brake pedal is fully released. Inching may occur in an intermediate range of motion of the inch/brake pedal when the vehicle transmission is only partially engaged. Many industrial vehicles include an accelerator pedal which is used to control the engine speed. Inching operation is further described in co-pending U.S. application Ser. No. 12/268,615, the contents of which are incorporated by reference in their entirety.

In one embodiment, no braking occurs during the first range of motion associate with the inching operation. In another embodiment, overlap between inching and braking functions may occur about an approximate range of movement of the pedal near the partially depressed position BPP1.

Figure 10A:
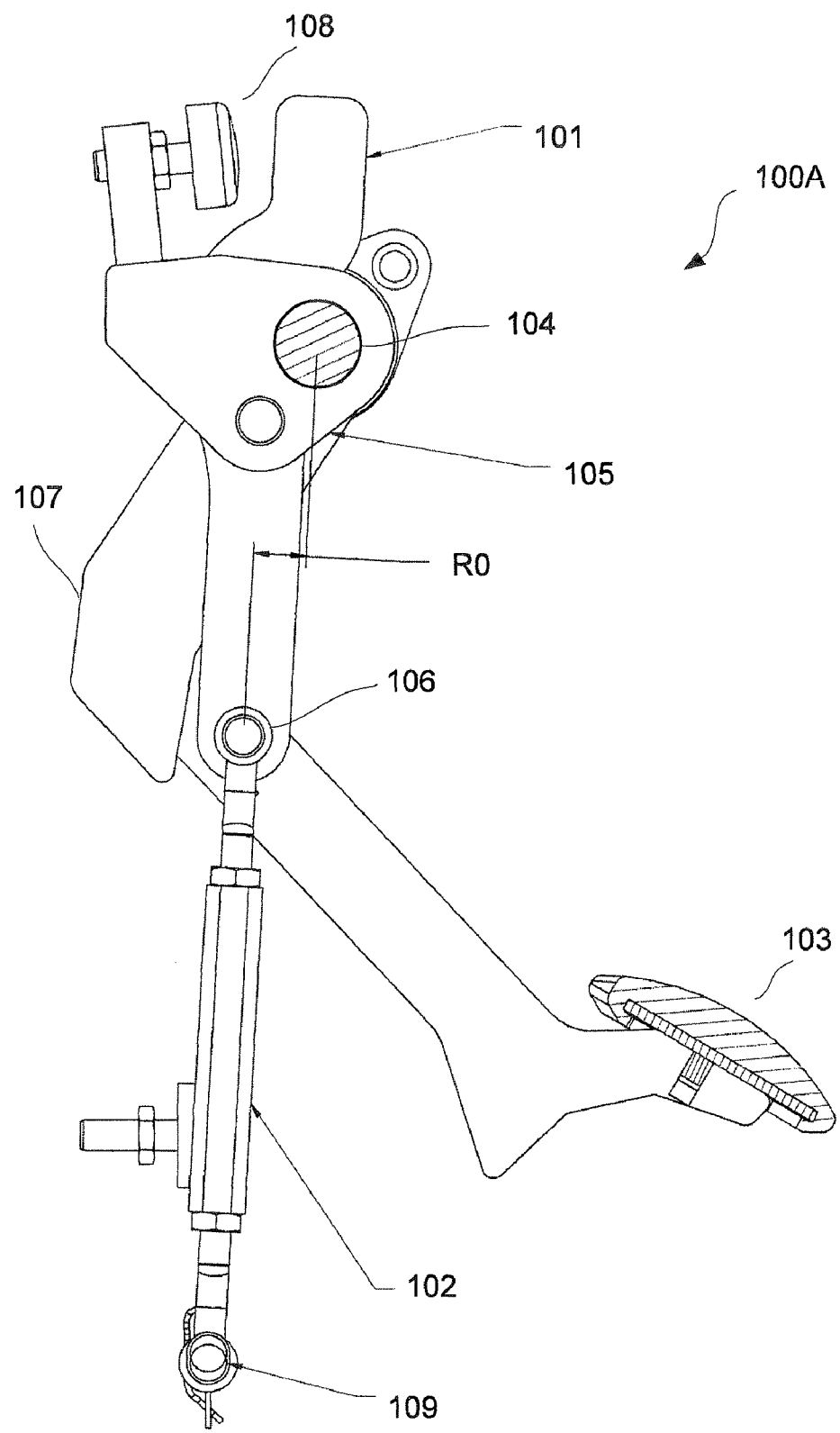
FIG. 10A illustrates an embodiment of an example brake pedal linkage located in a fully released position.

FIG. 10A illustrates an embodiment of an example brake pedal linkage 100A located in a fully released position. In one embodiment, the brake pedal linkage 100A may be understood to operate between, or with, brake actuation 90 and the brake assembly 30 as shown in FIG. 1.

Forklift operation often requires fine control as the vehicle approaches or departs a load. This control is provided, in part, by the engagement of tractive effort along with precisely metered braking force, such as through inching operation. The control of the brake pedal operation during inching may be combined with conventional braking during travel, so that the brake pedal behaves as the vehicle operator expects during all modes of operation. To meet the ergonomic objectives of the operator, force and pedal travel targets for select deceleration rates are designed to provide the desired control over multiple modes of operation. The staged brake pedal linkage 100A provides the range parameters for inching and braking.

A staged linkage system provides for improved control (including feedback force and pedal position) during each stage of braking and related modes of operation. In one embodiment, the brake pedal linkage 100A comprises mechanical linkage, which provides a robust system with sufficient design tolerance, consistency of application, and minimal complexity. Other embodiments comprise resistance springs, complex pressure/stroke curves within a brake control valve, cam action, or other braking components.

By way of illustration, operation of the brake pedal linkage 100A may be described by four stages of a braking stroke. An example operation is described making reference to one or more of FIGS. 10A, 10B and 10C.

Stage I of the braking operation is associated with a released position of the brake pedal linkage 100A, with the brake pedal 103 up, and wherein no braking force is exerted. This is illustrated in FIG. 10A, and associated with effective radius R0. In one embodiment, brake pedal 103 provides similar ranges of motion as brake pedal 95 in FIG. 9.

Figure 10B:
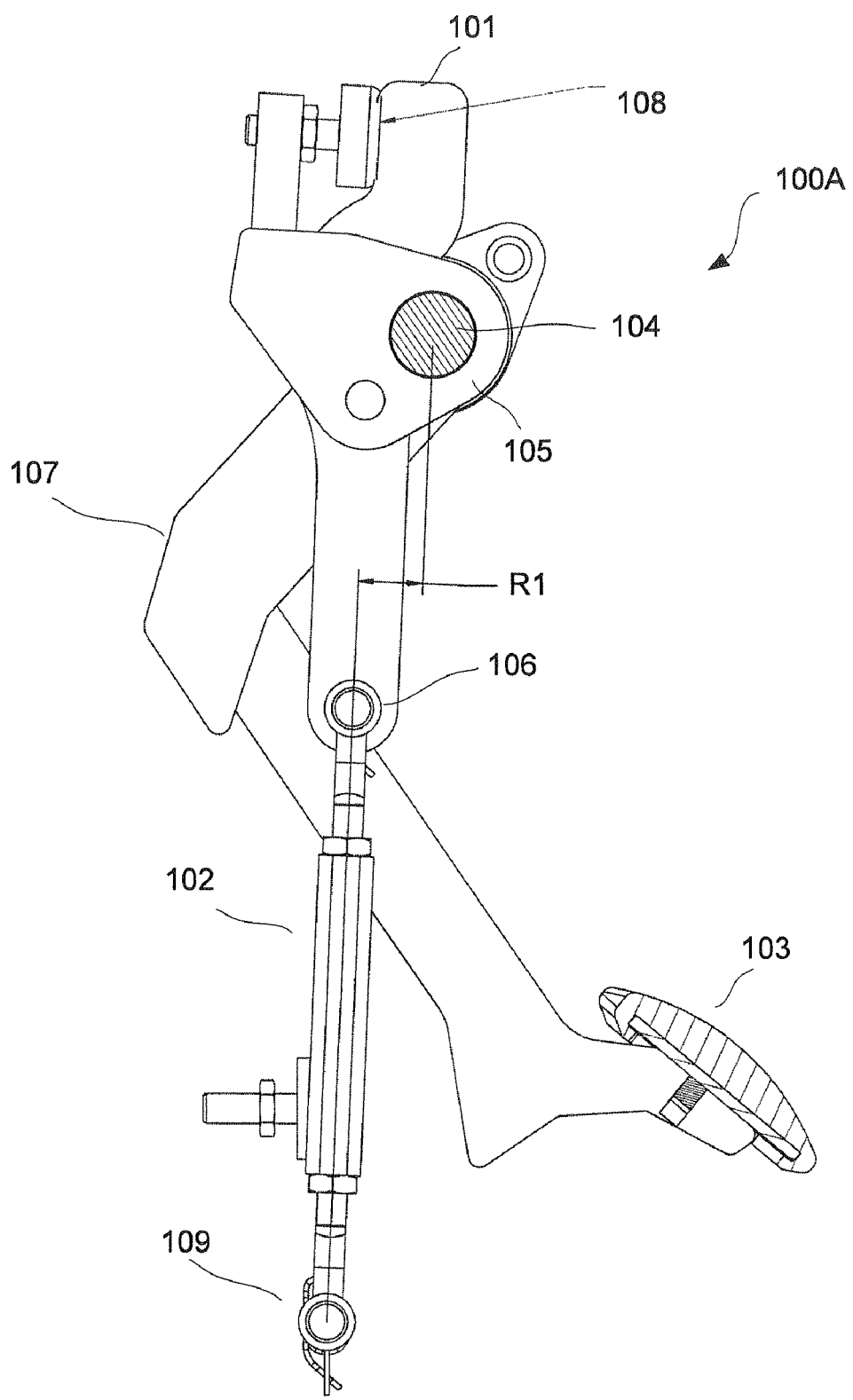
FIG. 10B illustrates the example brake pedal linkage of FIG. 10A located in a partially depressed position.

FIG. 10B illustrates the example brake pedal linkage 100A of FIG. 10A located in a partially depressed position. FIG. 10B is associated with stage II of the braking operation, where the brake pedal 103 is located in a position intermediate that of fully released and fully pressed. At stage II, the braking system provides an onset of braking torque in some embodiments. In other embodiments, stage II identifies the inching operation. Where stage II identifies an inching operation, stage III identifies the brake position at which braking torque is initiated. There may be overlap between stages II and III such that both inching and braking may be performed simultaneously.

Figure 10C:
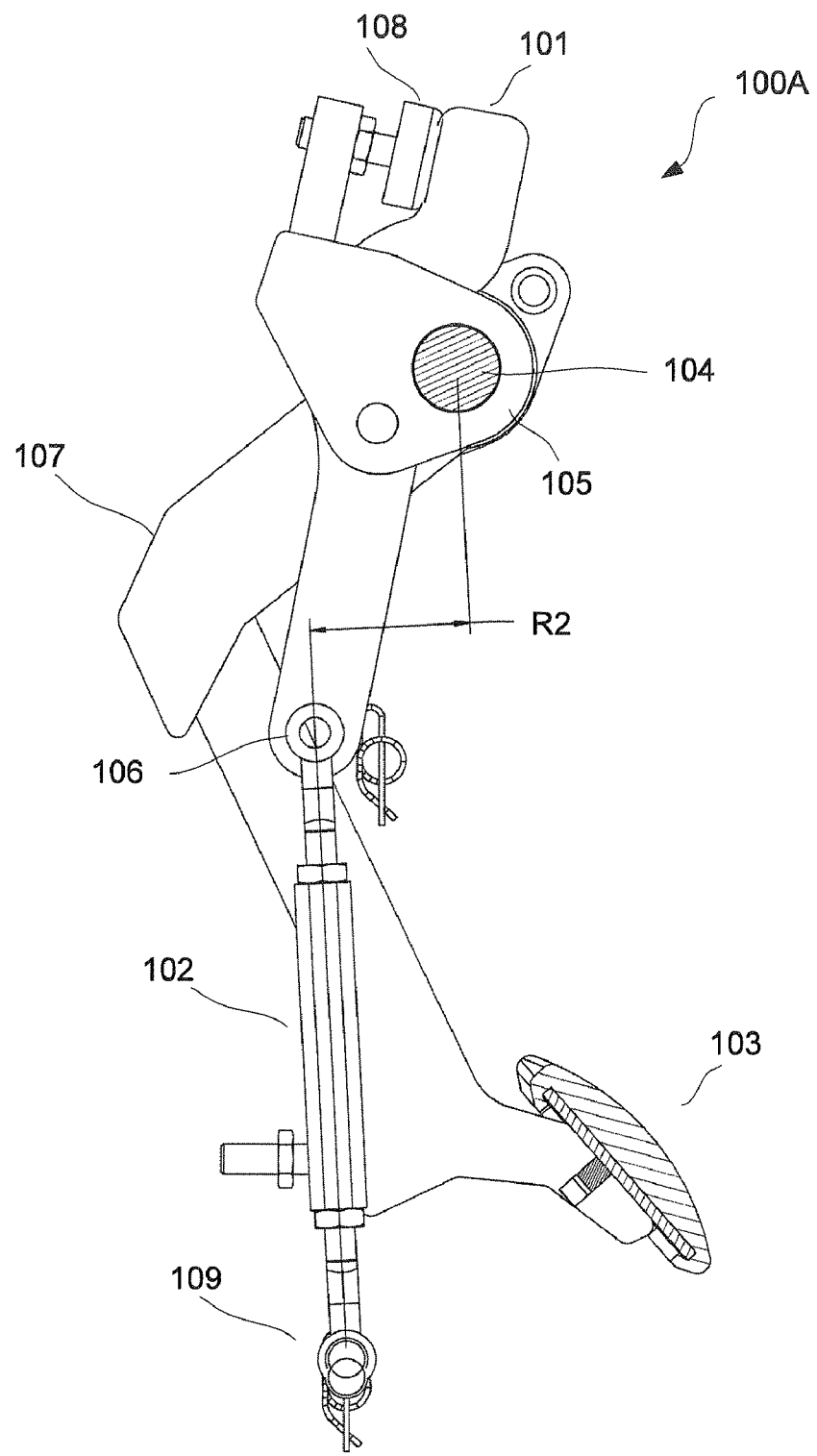
FIG. 10C illustrates the example brake pedal linkage of FIG. 10A located in a fully depressed position.

FIG. 10C illustrates the example brake pedal linkage 100A of FIG. 10A located in a fully depressed position. FIG. 10C is associated with stage IV, where the brake pedal 103 is located in a fully depressed position, to provide maximum braking effort.

The staged, brake pedal linkage 100A comprises a pedal/crank 105 which is configured to drive a primary link 101. Pedal/crank 105 may be rigidly connected to the brake pedal 103 through brake arm 107. Pedal/crank 105 rotates about pivot 104 as the brake pedal 103 is depressed. The primary link 101, in turn, drives a secondary link 102 which acts directly on a brake control (e.g. reverse modulating valve), via connection 109. Primary link 101 drives secondary link when the adjustment stop 108 comes into contact with the primary link 101 as the brake pedal 103 is depressed (see FIG. 10B). The base for the adjustment stop 108 may be rigidly attached to the pedal/crank 105.

The line of action of the secondary link 102 varies depending on the stroke range (operating stage of the brake pedal) and how the primary link 101 is controlled during that stage. The primary link 101 and the secondary link 102 are pivotally connected by pivot 106. By affecting the pivot range of the primary link 101 the effective radius of the brake pedal linkage 100A, as well as the rate of change of this effective radius, can be made to vary during different stages of operation, or during different ranges of motion, of the brake pedal assembly.

The effective radius varies during the different stages of the operation of the brake assembly. Effective radius R0 is illustrated in FIG. 10A and is associated with a brake pedal 103 located in the fully released position. Effective radius R1 is illustrated in FIG. 10B and is associated with a first range of motion of the brake pedal 103 in a partially depressed position. Effective radius R2 is illustrated in FIG. 10C and is associated with a second range of motion of the brake pedal 103 including the fully depressed position.

Figure 11:
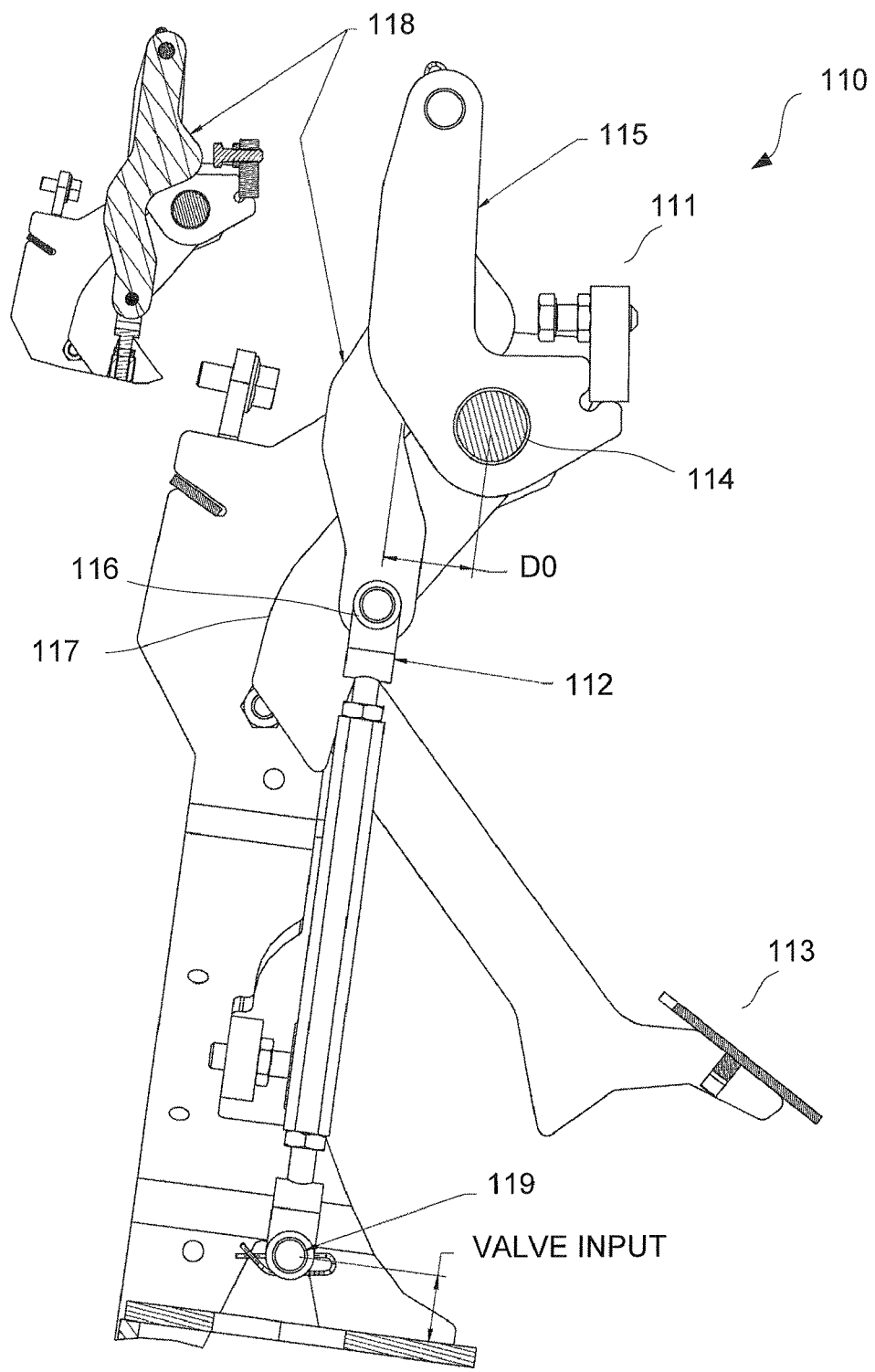
FIG. 11 illustrates a further embodiment of an example brake pedal linkage located in a fully released position.

FIG. 11 illustrates a further embodiment of an example brake pedal linkage 110 located in a fully released position. Brake pedal 113 is lifted up, and no braking force is being applied. Whereas the effective radius D0 of brake pedal linkage 110 is associated with the fully released position of the brake pedal 113 (e.g. stage I), one skilled in the art will appreciate that primary link 111, secondary link 112, brake pedal 113, pivot 114, pedal/crank 115, pivot 116, brake arm 117, adjustment stop 118, and connection 119 may operate similarly as shown and described in FIGS. 10A, 10B, and 10C to provide all four stages associated with the brake pedal system. In one embodiment, brake pedal 113 provides similar ranges of motion as brake pedal 95 in FIG. 9.

For each stage of the brake pedal system, specific targets of pedal rotation, pedal effort and braking torque may be managed by controlling a drive ratio applied to the braking valve. Braking parameters may be determined based on the overall performance characteristics of the brake and braking valve combination (e.g. pressure/torque curves). Two example configurations of stage linkage include a) Decreasing-Decreasing Brake Linkage Ratio and b) Increasing-Decreasing Brake Linkage Ratio.

Decreasing-Decreasing Brake Linkage Ratio

Figure 12:
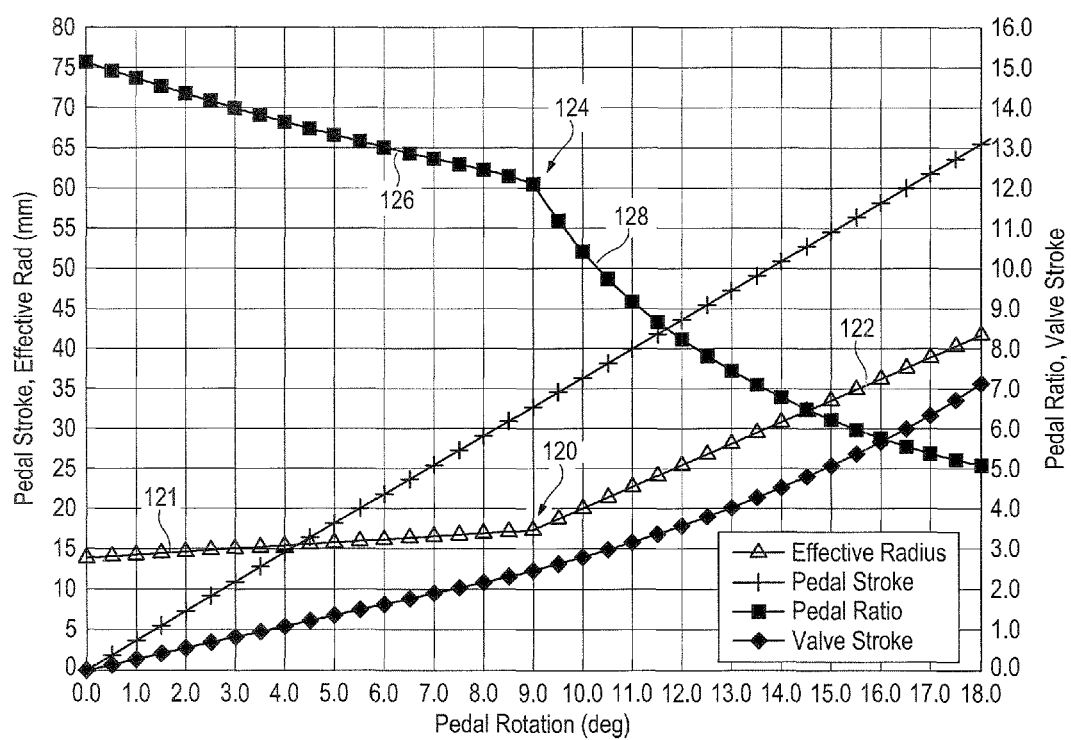
FIG. 12 illustrates an example brake actuation diagram associated with the brake pedal linkage of FIGS. 10A, 10B, 10C.

FIG. 12 illustrates an example brake actuation diagram associated with the brake pedal linkage of FIGS. 10A, 10B, 10C. The initial effective radius increases at one rate during the initial stage (to provide suitable feedback during inching) then increases at a different rate (generally much greater) as braking demand increases. The force required to press the brake pedal 103 increases as the effective radius increases due to the longer moment arm. As the effective radius R2 of stage IV is greater than the effective radius R1 of stage II, a vehicle operator would experience a greater resistance of the brake pedal as the mode of operation transitions from inching to vehicle braking. This provides an ergonomic response indicating when braking of the vehicle is initiated, such as in the case where the first range of motion is primarily associated with an inching operation, and the second range of motion is primarily associated with a braking operation.

The brake actuation diagram of FIG. 12 comprises a plot 120 illustrating pedal rotation on the horizontal axis and effective radius on the vertical axis. A first range of motion 121 of the brake pedal 103 is illustrated with the pedal rotating between zero and some intermediate pedal position (e.g. stage II). The first range of motion 121 comprises the position of the brake pedal 103 associated with the effective radius R1. A second range of motion 122 of the brake pedal 103 is illustrated with the pedal rotating between the intermediate position and the fully depressed pedal position (e.g. stage IV). The second range of motion 122 comprises a position of the brake pedal 103 associated with the effective radius R2. In one embodiment the intermediate position occurs at about 9.0 degrees of pedal rotation.

The rate of change of effective radius associated with the first range of motion 121 is less than the rate of change of effective radius associated with the second range of motion 122. However, in the embodiment illustrated in FIG. 12, both rates are positive.

The brake pedal linkage 100A may provide a non-linear pedal ratio, as illustrated by pedal ratio curve 124. Pedal ratio curve 124 comprises a first decreasing pedal ratio portion 126 and a second decreasing pedal ratio portion 128. First and second decreasing pedal ratio portions 126, 128 generally have different slopes from each other. For example, second decreasing pedal ratio portion 128 may include a slope that is greater than the slope associated with the first decreasing pedal ratio portion 126. In one embodiment, an initial slope of the second decreasing pedal ratio portion 128 is greater than the slope associated with the first decreasing pedal ratio portion 126. The slopes referred to with reference to pedal ratio portions 126, 128 may refer to slopes over a discrete pedal rotation or range of pedal rotation, an instantaneous slope, an average slope of a partial segment of the pedal ratio portion, or an average slope over the entire pedal ratio portion.

The pedal ratio is the ratio between force input through a pedal 103 in FIG. 10A and a force output from the brake pedal linkage 100A. The force output and stroke from the brake pedal linkage 100A is input to the brake control valve 410 (FIG. 4) through connection point 109 (FIGS. 10A-10C) and corresponds to the brake torque. The first range of motion 121 of the brake pedal 103 determines the first effective radius R1 (FIG. 10B). The second range of motion 122 of the brake pedal 103 determines the second effective radius R2 (FIG. 10C). The pedal ratio of the spring-applied braking system associated with the first effective radius R1 may be less than a pedal ratio associated with the second effective radius R2. A greater pedal ratio associated with effective radius R2 may provide for more controlled variation of the braking force during stage IV.

The brake pedal linkage 100A may be configured to control the brake release mechanism of the brake assembly 30. During the initial range of motion of the pedal 103, the brake pedal linkage 100A applies a first braking force on the piston 32 (FIG. 3) that is greater than the spring force. The brake pedal linkage 100A may be understood as providing a two-stage linkage comprises of the first effective radius R1 and the second effective radius R2. A first effective radius R1 of the brake pedal linkage 100A may be associated with the first range of motion of the pedal 103. The brake piston 32 does not contact the brake plate during the initial range of motion.

During a subsequent range of motion of the pedal 103, the brake pedal linkage 100A applies a second braking force on the piston 32 that is less than the spring force applied by the spring assembly 35 in FIG. 2. The second effective radius R2 of the brake pedal linkage 100A may be associated with the second range of motion of the pedal 103. The second effective radius R2 may be greater than the first effective radius. The brake piston 32 contacts the brake plate during the subsequent range of motion, and provides a braking force.

The pedal 103 and pedal linkage 100A are configured to modulate the braking force according to different positions of the pedal 103 within the subsequent range of motion between the partially depressed position BPP1 and the fully depressed position BPP2 (FIG. 9). Modulating the braking force provides for a variable, smooth, and dynamic range of vehicle braking. Vehicle braking may be further modulated by throttling the amount of hydraulic fluid leaving the piston chamber when the brakes are being engaged, to avoid an abrupt braking of the vehicle.

The first effective radius R1 may provide a relatively low pedal effort when the pedal 103 is in the first range of motion associated with the inching operation. This may be characterized as a low effort to angle ratio. The second effective radius R2 may provide a relatively high pedal effort when the pedal 103 is in the second range of motion associated with the braking operation. This may be characterized as a high effort to angle ratio. Accordingly, the effort to angle ratio associated with the second effective radius R2 may be greater than the effort to angle ratio associated with the first effective radius R1.

The dual-stage linkage provides for different rates of hydraulic pressure application in relation to pedal 103 position. The initial rate of hydraulic pressure associated with the first range of motion of the pedal 103 may be sufficiently high to provide brake pack clearance. Varying the effective radius varies the effective hydraulic force and ergonomic response.

Increasing-Decreasing Brake Linkage Ratio

Figure 13:
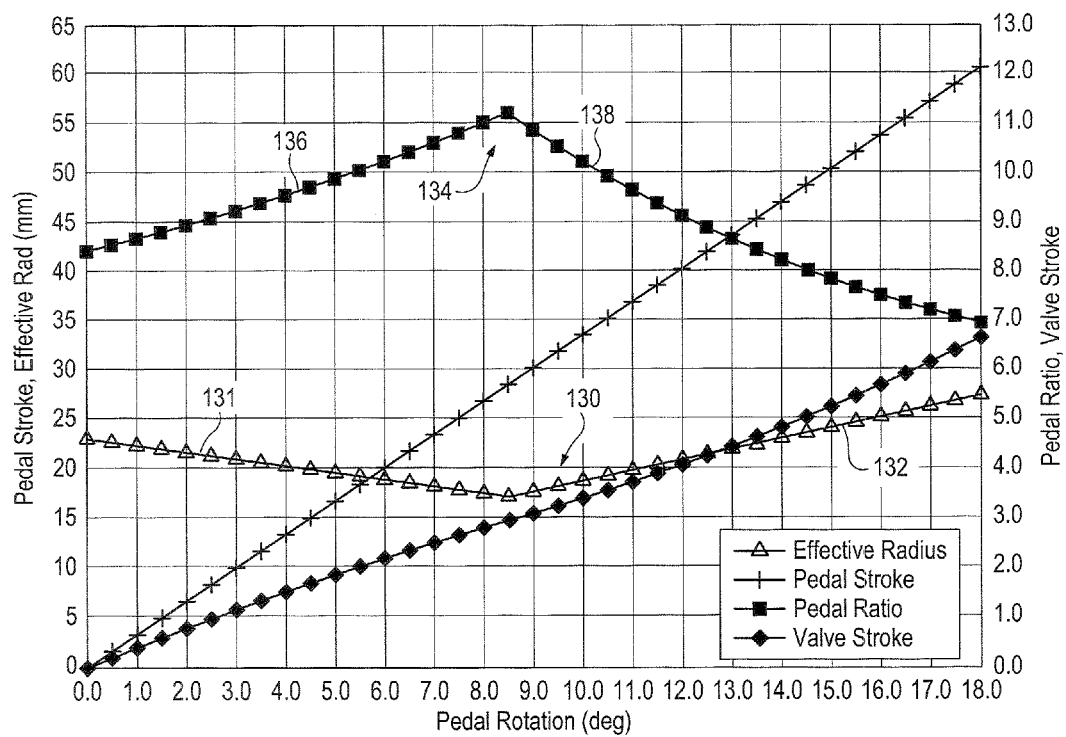
FIG. 13 illustrates an example brake actuation diagram associated with the brake pedal linkage of FIG. 11.

FIG. 13 illustrates an example brake actuation diagram associated with the brake pedal linkage of FIG. 11. In this embodiment, the effective radius D0 acting on the braking valve decreases through the initial stage (to maintain low pedal force during inching) then increases as braking demand increases (providing increasingly firm feedback).

The brake actuation diagram of FIG. 13 comprises a plot 130 illustrating pedal rotation on the horizontal axis and effective radius on the vertical axis. A first range of motion 131 of the brake pedal 113 is illustrated with the pedal rotating between zero and some intermediate pedal position (e.g. stage II). The first range of motion 131 comprises the position of the brake pedal 113 associated with a first effective radius. A second range of motion 132 of the brake pedal 113 is illustrated with the pedal rotating between the intermediate position and the fully depressed pedal position (e.g. stage IV). The second range of motion 132 comprises a position of the brake pedal 113 associated with a second effective radius. In one embodiment the intermediate position occurs at about 9.0 degrees of pedal rotation.

The brake pedal linkage 110 (FIG. 11) may provide a non-linear pedal ratio, as illustrated by pedal ratio curve 134. Pedal ratio curve 134 comprises an increasing pedal ratio portion 136 and a decreasing pedal ratio portion 138. In one embodiment, increasing pedal ratio portion 136 has an approximately inverse slope as the decreasing pedal ratio portion 138. The slopes referred to with reference to pedal ratio portions 136, 138 may refer to slopes over a discrete pedal rotation or range of pedal rotation, an instantaneous slope, an average slope of a partial segment of the pedal ratio portion, or an average slope over the entire pedal ratio portion.

The pedal ratio is the ratio between force input through a pedal 113 in FIG. 11 and a force output from the brake pedal linkage 110. The force output and stroke from the brake pedal linkage 110 is input to the brake control valve 410 (FIG. 4) through connection point 119 (FIG. 11) and corresponds to the brake torque. Similar to that described with reference to FIGS. 10A-10C, the pedal ratio of the spring-applied braking system associated with the first effective radius may be less than a pedal ratio associated with the second effective radius. A greater pedal ratio associated with the second effective radius may provide for more controlled variation of the braking force during stage IV.

The rate of change of effective radius associated with the first range of motion 131 is shown as being negative. The rate of change of effective radius associated with the second range of motion 132 is shown as being positive.

Figure 14:
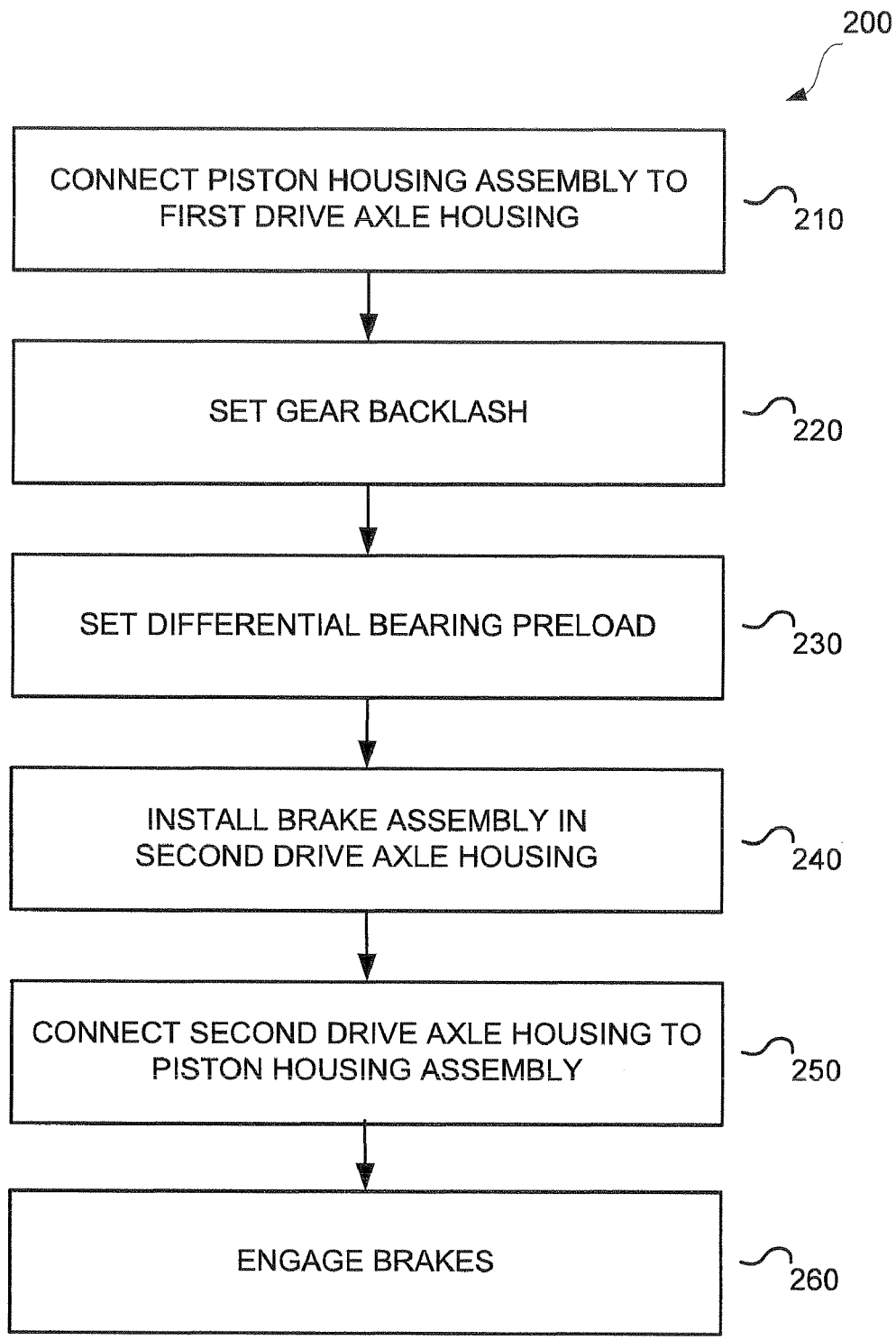
FIG. 14 illustrates an example method of assembly of spring-applied brakes and an axle.

FIG. 14 illustrates an example method of assembly 200 of a spring-applied brake and an axle. The method of assembly 200 may be understood to operate with, but not limited by, the devices, apparatus, and systems described with respect to the various embodiments illustrated herein as FIGS. 1-13.

A piston housing assembly may be assembled prior to, or as a preliminary operation, of the method of assembly 200. A piston, such as brake piston 32, is installed into the piston housing, such as piston housing 34. A spring assembly, such as spring assembly 35, is installed against the piston. A bearing cover, such as differential bearing cover 38, is placed over the spring assembly. As part of the assembly process, the bearing cover and spring assembly are compressed together when the bearing cover is installed.

At operation 210, the piston housing is connected to a first drive axle housing, such as first drive axle housing 22. A brake piston may be located, at least in part, within the piston housing.

At operation 220, a gear backlash is set.

At operation 230, a differential bearing preload is set. The differential bearing may be located, at least in part, in the bearing cover, wherein the differential bearing is preloaded with a clamp force. The clamp force may set an engagement of, and minimize backlash in, the differential gearing.

At operation 240, a brake assembly is installed in a second drive axle housing.

At operation 250, the piston housing is connected to the second drive axle housing, wherein the drive axle passes through the spring assembly. In one embodiment, the piston housing is mounted at a central portion of the axle. A spring force of the preloaded spring assembly causes the brake piston to act against a brake assembly.

At operation 260, the brake assembly is engaged, wherein the brake assembly is located along the axle. In one embodiment, the brake assembly is located at the central portion of the axle.

The compact size of the brake assembly allows for a single brake assembly at the differential assembly. The single brake assembly results in an elimination of redundant parts (pistons, friction discs, separator plates, brake lines, etc) that are typical of a two brake drive axle assembly. The compact size further allows for common center section assemblies between different types of industrial vehicles having different space requirements. The brake assembly may be provided as a modular assembly which can replace an existing mechanical braking assembly.

The spring design allows the brake assembly to be built as a sub-assembly for easy integration to multiple drive axle assemblies. The spring applied brake actuator combines the functionality of a service and park brake. This eliminates the redundancy of additional parts needed for a separate service and park brake actuation systems. The brake assembly may be manufactured and assembled at a lower cost due to elimination of duplicated components from conventional brake systems.

The brake assembly may be used to provide an automatic park brake for an industrial vehicle. The park brakes may be engaged when an operator sensor indicates the operator has left the vehicle, for example. In other embodiments, the park brake is intentionally engaged by the operator to avoid inadvertent actuation of the brake assembly.

The system and apparatus described above can use dedicated processor systems, micro-controllers, programmable logic devices, or microprocessors that perform some or all of the operations. Some of the operations described above may be implemented in software and other operations may be implemented in hardware. It is further understood that computer-readable medium having instructions stored thereon may be provided, wherein when the instructions are executed by at least one device, they are operable to perform some or all of the operations.

Where specific numbers are provided, they are given as examples only and are not intended to limit the scope of the claims. The relationship between inputs and outputs of the various operations, computation, and methods described herein may be established by algorithms or by look up tables contained in processor memory.

For the sake of convenience, the operations are described as various interconnected functional blocks or diagrams. This is not necessary, however, and there may be cases where these functional blocks or diagrams are equivalently aggregated into a single logic device, program or operation with unclear boundaries.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A brake assembly comprising:
a piston housing;
a piston moveably arranged within the piston housing;
a bearing cover mounted to the piston housing;
a spring assembly located between the piston and the bearing cover, wherein mounting the bearing cover to the piston housing compresses the spring assembly to achieve an initial spring force, and wherein the initial spring force of the spring assembly causes the piston to act against a vehicle brake when the brake assembly is mounted to a vehicle axle that passes through the spring assembly; and
a wheel hub coupler configured to transfer torque from a planetary carrier to a wheel hub, wherein the wheel hub coupler is further configured to disengage the wheel hub from the planetary carrier so that the wheel hub is free to rotate about the vehicle axle when the vehicle brake is engaged.

2. The brake assembly according to claim 1, wherein the piston is the only piston provided in the brake assembly, and wherein the brake assembly provides both service braking and park braking functionality.

3. The brake assembly according to claim 1, wherein the wheel hub coupler comprises internal splines that are configured to engage the planetary carrier when the wheel hub is locked to the vehicle axle, and wherein the internal splines are configured to disengage the planetary carrier when the wheel hub is free to rotate about the vehicle axle.

4. The brake assembly according to claim 1, wherein the spring assembly comprises a plurality of concentric springs that share a common central axis.

5. The brake assembly according to claim 4, wherein the plurality of concentric springs comprise nested wave springs.

6. The brake assembly according to claim 4, wherein the plurality of concentric springs comprise a series of conical washers located adjacent to one another.

7. The brake assembly according to claim 4, wherein only one of the plurality of concentric springs is configured to contact the piston.

8. A forklift truck, comprising:
vehicle brakes including a brake plate;
a brake piston configured to contact the brake plate to provide a braking force when the vehicle brakes are engaged;
a piston housing;
a spring assembly compressed with a spring force, wherein the spring force causes the brake piston to act against the brake plate;
a brake release mechanism configured to cause the brake piston to move away from the brake plate to decrease the braking force;
an axle shaft that passes through both the brake plate and the spring assembly; and
a bearing cover that houses a differential bearing, wherein the bearing cover is mounted to the piston housing to preload the spring assembly with the spring force.

9. The forklift truck according to claim 8, further comprising:
an axle housing which houses the axle shaft, wherein the bearing cover provides alignment of a first side of the axle housing with a second side of the axle housing.

10. The forklift truck according to claim 8, further comprising:
a first wheel hub mounted on a left side of the axle shaft; and
a second wheel hub mounted on a right side of the axle shaft, wherein the vehicle brakes are located near a central portion of the axle shaft intermediate the first wheel hub and the second wheel hub.

11. The forklift truck according to claim 10, wherein the vehicle brakes apply equal braking force to both the first wheel hub and the second wheel hub.

12. The forklift truck according to claim 11, wherein the spring assembly comprises a series of concentric spring members sharing a common centerline with the brake plate.

13. The forklift truck according to claim 12, wherein an axis of rotation of the axle shaft is oriented along the common centerline.

14. The forklift truck according to claim 8, further comprising:
a wheel hub;
a planetary carrier located at an end of the axle shaft; and
a wheel hub coupler for transferring torque from the planetary carrier to the wheel hub, wherein the wheel hub coupler is configured to disengage the wheel hub from the planetary carrier so that the wheel hub is free to rotate about the axle shaft when the vehicle brakes are engaged.

15. The forklift truck according to claim 14, wherein the wheel hub coupler comprises internal splines that are configured to engage the planetary carrier when the wheel hub is locked to the axle shaft, and wherein the internal splines are configured to disengage the planetary carrier when the wheel hub is free to rotate about the axle shaft.

16. The forklift truck according to claim 15, wherein the wheel hub coupler comprises one or more positioning devices that move the wheel hub coupler along an axis of rotation of the axle shaft and away from the planetary carrier.

17. The forklift truck according to claim 14, wherein the wheel hub coupler is configured to both lock and unlock the wheel hub to the planetary carrier.

18. The forklift truck according to claim 8, further comprising:
an operator brake pedal configured to control the brake release mechanism according to a pedal effort and a pedal angle associated with the operator brake pedal; and brake pedal linkage operatively connected to the operator brake pedal and configured to:
apply a first release force on the brake piston that is equal to or greater than the spring force during an initial range of motion of the operator brake pedal, wherein a first ratio of the pedal effort to the pedal angle is associated with the initial range of motion; and
apply a second release force on the brake piston that is less than the spring force during a subsequent range of motion of the operator brake pedal, wherein a second ratio of the pedal effort to the pedal angle is associated with the subsequent range of motion of the operator brake pedal, and wherein the second ratio is greater than the first ratio.

19. The forklift truck according to claim 18, wherein the pedal angle is associated with an effective radius of rotation of the brake pedal linkage, wherein the initial range of motion is associated with a first rate of change of the effective radius, wherein the subsequent range of motion is associated with a second rate of change of the effective radius, and wherein the second rate of change of the effective radius is greater than the first rate of change of the effective radius.

20. The forklift truck according to claim 19, wherein the initial range of motion controls an inching function of the forklift truck, and wherein the first rate of change of the effective radius is associated with a negative mathematical slope.

21. A method of assembly, comprising:
connecting a piston housing to a first drive axle housing, wherein a brake piston is located, at least in part, within the piston housing;
setting a gear backlash;
preloading a differential bearing located, at least in part, in a bearing cover with a clamp force to set an engagement of differential gearing, wherein a spring assembly is located between the brake piston and the bearing cover;
installing a brake assembly in a second drive axle housing;
connecting the piston housing to the second drive axle housing, wherein an axle passes through the spring assembly, and wherein a spring force of the spring assembly causes the brake piston to act against a brake assembly; and
engaging the brake assembly, wherein the brake assembly is located along a central portion of the axle.

22. The method according to claim 21, further comprising:
aligning a left side of the axle to a right side of the axle along one or more pilot surfaces located on the piston housing and the bearing cover.

23. The method according to claim 21, further comprising:
hydraulically releasing the brake assembly, wherein a hydraulic force opposes the spring force.

* * * * *